(12) United States Patent
Williams

(10) Patent No.: US 12,493,835 B2
(45) Date of Patent: *Dec. 9, 2025

(54) SYSTEMS AND METHODS OF EVALUATING SOCIO-ECONOMIC AND ENVIRONMENTAL IMPACT

(71) Applicant: A.O. Consultum, Incorporated, Minneapolis, MN (US)

(72) Inventor: Alvin-o Williams, New Orleans, LA (US)

(73) Assignee: A.O. Consultum, Minneapolis, MN (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/233,810

(22) Filed: Aug. 14, 2023

(65) Prior Publication Data
US 2023/0385721 A1      Nov. 30, 2023

Related U.S. Application Data

(63) Continuation of application No. 17/730,103, filed on Apr. 26, 2022, now Pat. No. 11,727,324, which is a
(Continued)

(51) Int. Cl.
  *G06Q 10/063*    (2023.01)
  *G06Q 30/0201*   (2023.01)
  *G06F 16/958*    (2019.01)

(52) U.S. Cl.
  CPC ....... *G06Q 10/063* (2013.01); *G06Q 30/0201* (2013.01); *G06F 16/958* (2019.01)

(58) Field of Classification Search
CPC . G06Q 10/063; G06Q 30/0201; G06F 16/958
See application file for complete search history.

(56) References Cited

U.S. PATENT DOCUMENTS

| | | | | |
|---|---|---|---|---|
| 2003/0191674 A1* | 10/2003 | Hale | ............ | G06Q 30/018 705/317 |
| 2006/0041840 A1* | 2/2006 | Blair | ............ | G06Q 10/087 715/234 |

(Continued)

OTHER PUBLICATIONS

Kovach et al., "A Method To Measure the Environmental Impact of Pesticides", New York's Food and Life Sciences Bulletin, No. 132, 1992 (8 pages).
(Continued)

*Primary Examiner* — William S Brockington, III
(74) *Attorney, Agent, or Firm* — Foley & Lardner LLP

(57) ABSTRACT

A system and method for evaluating socio-economic and/or environmental impact automatically identifies and transmits to a user computing device a socio-economic and/or environmental impact web page of an organization. A computer database coupled to a server contains data for various socio-economic and/or environmental impact web pages, defining formatting elements configured to display impact data. The computer database receives a data feed of the impact data from the organization and/or from one or more of the organization's vendors, and automatically updates the organization's socio-economic and/or environmental impact web page. The system automatically generates in the socio-economic and/or environmental impact web page, a socio-economic and/or environmental impact quotient depiction representing socio-economic and/or environmental impact of resource allocations of the associated organization. The system uses hybrid input-output, econometric and environmental models to calculate a total economic impact ratio of the SGA (Selling, General & Administrative) costs of the organization on local communities.

20 Claims, 18 Drawing Sheets

Related U.S. Application Data continuation of application No. 16/813,553, filed on Mar. 9, 2020, now Pat. No. 11,315,049, which is a continuation of application No. 14/845,584, filed on Sep. 4, 2015, now Pat. No. 10,586,184.

(60) Provisional application No. 62/045,969, filed on Sep. 4, 2014.

(56) References Cited

U.S. PATENT DOCUMENTS

| | | | |
|---|---|---|---|
| 2006/0190368 A1* | 8/2006 | Kesterman | G06Q 40/02 707/999.1 |
| 2007/0061266 A1 | 3/2007 | Moore et al. | |
| 2009/0048941 A1 | 2/2009 | Strassmann | |
| 2012/0030191 A1 | 2/2012 | Zwicky et al. | |
| 2012/0197686 A1* | 8/2012 | Abu El Ata | G06Q 10/06393 705/7.39 |
| 2012/0311431 A1 | 12/2012 | Breaker et al. | |
| 2013/0124625 A1 | 5/2013 | Cathcart et al. | |
| 2014/0055803 A1 | 2/2014 | Uhlig et al. | |

OTHER PUBLICATIONS

Notice of Allowance issued for U.S. Appl. No. 17/730,103 dated Mar. 24, 2023 (13 pages).

* cited by examiner

SYSTEMS AND METHODS OF EVALUATING SOCIO-ECONOMIC AND ENVIRONMENTAL IMPACT

CROSS-REFERENCE TO RELATED APPLICATIONS

This application is a continuation of U.S. patent application Ser. No. 17/730,103, entitled "SYSTEMS AND METHODS OF EVALUATING SOCIO-ECONOMIC AND ENVIRONMENTAL IMPACT," filed Apr. 26, 2022, which is a continuation of U.S. patent application Ser. No. 16/813,553, entitled "SYSTEMS AND METHODS OF EVALUATING SOCIO-ECONOMIC AND ENVIRONMENTAL IMPACT," filed Mar. 9, 2020, which is a continuation of U.S. patent application Ser. No. 14/845,584, entitled "SYSTEMS AND METHODS OF EVALUATING SOCIO-ECONOMIC AND ENVIRONMENTAL IMPACT," filed Sep. 4, 2015, which claims the benefit of U.S. Provisional Application No. 62/045,969, filed Sep. 4, 2014, entitled "SYSTEMS AND METHODS OF EVALUATING ECONOMIC IMPACT," all of which are hereby incorporated by reference in their entirety.

FIELD OF THE DISCLOSURE

The subject matter disclosed herein related generally to computer-based systems and methods for analyzing market impact through automated processes of identification and valuation of market forces.

BACKGROUND

For many years, one solution for preserving declining economies has been to attract more investment in the form of tourism, targeted spending with under-represented groups, and development of new entertainment or retail venues. Although many of these strategies have been effective in the short-term, over the long term as the novelty of these investments start to diminish the economic rationale for these investments from a consumer perspective becomes invisible, because it is difficult for people to visually decipher the socio-economic and/or environmental benefit of their spending behaviors.

Conventional computing devices and computing networks are frequently employed by users to obtain all types of information. However, when socio-economic and/or environmental impact information is requested, this information is difficult to find, if it even exists. Furthermore, due to the highly technical nature of social, economic & environmental impact information, it is extremely difficult for the average person to decipher the real meaning behind the information presented. Therefore, even when socio-economic and/or environmental impact data is available, the ability to use and comprehend this information is difficult.

With influences like shifting demographics, international competition, global environmental changes and the erosion of local economies coupled with universal access to information, 24/7 media scrutiny and the enduring low level of consumer sentiment towards the economy, there is a growing public backlash against people and organizations that support business practices that are perceived to be at the expense of the environment or the greater community. This backlash may result in negative internal and external perceptions of an organization, which can directly impact employee morale, shareholder value, customer relationships and brand reputation.

One method of combating this backlash has been through the commissioning of economic or environmental impact studies. Some of the economic impact tools used to complete a study are IMPLAN, RIMS-II, and EMSI. Additionally one of the processes to assess the environmental aspects and potential impacts associated with a product, process, or service is through conducting a Life Cycle Assessment (LCA). The results of each of these studies are typically communicated in the format of a detailed report. These reports are usually highly technical in nature, verbose, and normally require 3 to 12 months to complete. Long lead times and antiquated data, combined with the technical knowledge needed to interpret the information contained within these reports, ultimately renders these types of studies informative at best, but often ineffective. Studies show that people tend to understand information more effectively through graphics compared to text. What is needed is a means for automatically generating socio-economic and/or environmental impact analysis and presenting the resulting data graphically, thereby capitalizing on graphically-oriented human understanding in this context. Further, as opposed to providing a periodic and static report, what is desired is a computer-based system that can update the presentation of this analysis in real-time based upon updated data from data sources.

SUMMARY

The systems and methods for evaluating socio-economic and/or environmental impact described herein facilitate tracking of social, economic & environmental impact data, and the automatic generation of graphical depictions of socio-economic and/or environmental impact data over a distributed communication medium, such as the Internet. The systems and methods use hybrid input-output, econometric and environmental models to calculate the unique impact value of an organization's labor and supply chain resource allocations. The systems and methods process data from primary and secondary sources to perform convolutions of the socio-economic and environmental impact data. A statistical model then summarizes the data into a consolidated ratio, which represents a unique impact sentiment value of a specific organization's resource allocations.

In an embodiment, a system comprises a computer database containing data for each of a plurality of socio-economic and/or environmental impact web pages, the data defining a plurality of formatting elements that are configured to display impact data; wherein each of the socio-economic and/or environmental impact web pages is associated with one of a plurality of organizations; wherein each of the socio-economic and/or environmental impact web pages includes an socio-economic and/or environmental impact quotient depiction representing socio-economic and/or environmental impact of resource allocations of the associated one of the plurality of organizations; wherein the computer database stores impact data associated with each of the plurality of organizations; and wherein the computer database receives a data feed of the impact data from at least one entity and at least one data source server; a computer server is coupled to the computer database and programmed to receive from a web browser of a user computing device an indication that a link has been activated on a web page that requests an identification of one of the plurality of organizations; upon receiving the indication that the link has been activated, automatically identify the socio-economic and/or environmental impact web page associated with the one of the plurality of organizations identified by the request; and in response to identification of the socio-economic and/or environmental impact web page, automatically retrieve stored impact data from the computer database corresponding to the socio-economic and/or environmental impact web page, generating an socio-economic and/or environmental impact quotient depiction, and transmitting to the user computing device the socio-economic and/or environmental impact web page formatted to include the socio-economic and/or environmental impact quotient depiction.

In another embodiment, a method comprises in response to activation of a link displayed by one of a plurality of socio-economic and/or environmental impact web pages, automatically identifying, by a computer server, a source page of the one of the plurality of socio-economic and/or environmental impact web pages on which the link has been activated; wherein a computer database coupled to the computer server contains data, for each of the plurality of socio-economic and/or environmental impact web pages, defining a plurality of formatting elements that are configured to display impact data; wherein each of the socio-economic and/or environmental impact web pages is associated with one of a plurality of organizations; and wherein each of the socio-economic and/or environmental impact web pages includes an economic impact quotient depiction representing socio-economic and/or environmental impact of resource allocations of the associated one of the plurality of organizations; automatically retrieving, by the computer server, from the computer database, for the one of the plurality of socio-economic and/or environmental impact web pages identified as the source page on which the link has been activated, the data defining the plurality of formatting elements that are configured to display impact data; and automatically generating, by the computer server, a socio-economic and/or environmental impact quotient depiction based upon the data defining the plurality of formatting elements that are configured to display impact data, and transmitting to the user computing device the socio-economic and/or environmental impact web page formatted to include the socio-economic and/or environmental impact quotient depiction.

In a further embodiment, a system comprises a computer database containing data for each of a plurality of socio-economic and/or environmental impact web pages, the data defining a plurality of formatting elements that are configured to display impact data; wherein each of the socio-economic and/or environmental impact web pages is associated with one of a plurality of organizations; wherein each of the socio-economic and/or environmental impact web pages includes a socio-economic and/or environmental impact quotient depiction representing socio-economic and/or environmental impact of resource allocations of the associated one of the plurality of organizations; wherein the computer database stores impact data associated with each of the plurality of organizations; and wherein the computer database receives a data feed of the impact data from at least one vendor associated with the one of the plurality of organizations, and wherein the impact data includes one or more of economic data, employee data, environmental data, and locality data of the vendor associated with the one of the plurality of organizations; a computer server is coupled to the computer database and programmed to receive from the web browser of a user computing device an indication that a link has been activated on a web page that requests an identification of one of the plurality of organizations; upon receiving the indication that the link has been activated, automatically identify the socio-economic and/or environmental impact web page associated with the one of the plurality of organizations identified by the request; and in response to identification of the socio-economic and/or environmental impact web page, automatically retrieve stored impact data from the computer database corresponding to the socio-economic and/or environmental impact web page, generating an socio-economic and/or environmental impact quotient depiction, and transmitting to the user computing device the socio-economic and/or environmental impact web page formatted to include the socio-economic and/or environmental impact quotient depiction.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
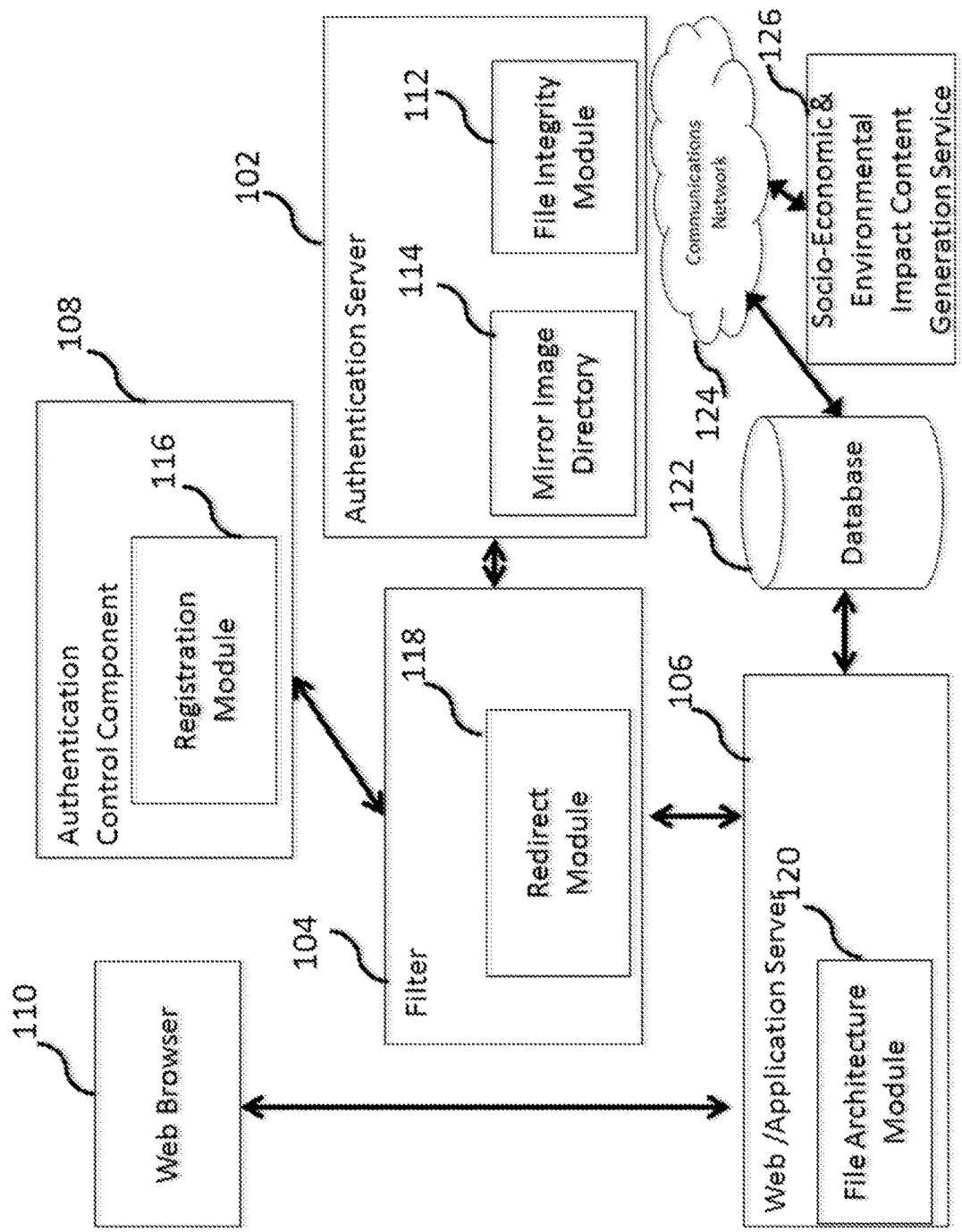
FIG. 1 is a block diagram of a system and method of measuring socio-economic and/or environmental impact and automatically generating graphical socio-economic and/or environmental impact content over a distributed communication medium, such as the Internet, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

A system and method for evaluating the socio-economic and/or environmental economic impact automatically identifies and transmits to a user computing device a socio-economic and/or environmental impact web page of an organization. In an embodiment, the system includes a computer database that contains data, for each of a plurality of socio-economic and/or environmental impact web pages, which define a plurality of formatting elements that are configured to define impact data. Each of the socio-economic and/or environmental impact web pages is associated with one of a plurality of organizations, and stores impact data associated with the associated organization.

In an embodiment, a computer server coupled to the computer database is programmed to receive from the web browser of a user computing device an indication that a link has been activated on a web page. The indication of activating the web page link requests identification of one of the plurality of organizations. Upon receiving this indication, the server automatically identifies the socio-economic and/or environmental impact web page associated with the one of the plurality of organizations. The server then automatically retrieves stored impact data corresponding to the socio-economic and/or environmental impact web page from the computer database, and generates a socio-economic and/or environmental impact quotient depiction. The system transmits to the user computing device the socio-economic and/or environmental impact web page, formatted to include the socio-economic and/or environmental impact quotient depiction.

In an embodiment, the computer database receives a data feed of impact data from at least one entity and at least one data source server. As used in the present disclosure, the impact data received from at least one entity and stored in the computer database is sometimes called socio-economic and/or environmental impact data. The at least one entity may include one of the plurality of organizations, also referred to as source organizations in the present patent disclosure. Additionally, the at least one entity may include a vendor of one of the organizations. In the case of impact data from a vendor of one of the organizations, the impact data may include economic data, employee data, environmental and locality data of the vendor and the vendor's employees.

In an embodiment, upon receiving updated impact data from the data source server, the system automatically updates the socio-economic and/or environmental impact web page based upon the updated impact data. In an embodiment, upon receiving updated impact data from the data source server, the system automatically updates an economic impact quotient depiction included in the socio-economic and/or environmental impact web page based upon the updated impact data.

In an embodiment, the socio-economic and/or environmental impact quotient depiction provides a visually distinctive representation of an socio-economic and/or environmental impact quotient. The socio-economic and/or environmental impact quotient depiction may show an increase, decrease, or unchanged value of a first socio-economic and/or environmental impact quotient, in comparison to the value of a second socio-economic and/or environmental impact quotient. In an embodiment, the first socio-economic and/or environmental impact quotient represents a current socio-economic and/or environmental impact quotient, and the second socio-economic and/or environmental impact quotient represents a previous socio-economic and/or environmental impact quotient. As used this embodiment, the present system and method can track and report, in real time, changes in socio-economic and/or environmental impact quotients of an organization. In another embodiment, the first socio-economic and/or environmental impact quotient represents a post-change socio-economic and/or environmental impact quotient, and the second socio-economic and/or environmental impact quotient represents a pre-change socio-economic and/or environmental impact quotient. As used in this embodiment, the present system and method can perform efficient "what if" analyses to predict changes in socio-economic and/or environmental impact quotients of an organization that would occur in response to a potential project, or other potential change, of an organization.

In an embodiment, the system uses hybrid input-output, econometric and environmental models to calculate a total socio-economic and/or environmental impact ratio of an organization. In an embodiment, the socio-economic and/or environmental impact ratio represents the SGA (Selling, General & Administrative) costs of the organization on local communities.

Producing data visualizations may be an effective technique for graphically conveying collected data, results of socio-economic and/or environmental impact studies, and conclusions derived from the studies. Effective data visualizations are more flexible and attractive than text-based reporting. By communicating multifaceted data in a visually attractive and comprehensible manner, people are able to grasp complex information more effectively. Depending on how data is presented, it can be used to create actionable steps to provoke change. Today, people are frequently nearby screens, such as a computer, tablet, or smartphone, displaying mountains of information, and so people consume data in small chunks of data by skimming headlines and browsing nuggets of data. As brevity becomes more essential, real-time data visualizations of complex economic impact data present organizations with an opportunity to deliver knowledge, progress, and authenticity to stakeholders, and may be formatted to be quickly consumable, understandable, and/or memorable.

By making technical economic impact information easier to comprehend and by using an approach that uses current data to calculate socio-economic and/or environmental impact, organizations may effectively communicate socio-economic and/or environmental impact data to more dynamically support the current perceptions of internal and external stakeholders; demonstrate that an organization's current practices are in line with its values; prove that an organization's practices are in line with perceived social norms; and showcase how an organization, its supply chain and its labor pools are doing to promote what its brand implies, among other advantages. It should be appreciated that other advantages may be realized, and that this disclosure is not intended to be limited to the embodiments disclosed herein.

The present disclosure provides a system and method of measuring socio-economic and/or environmental impact and automatically generating graphical socio-economic and/or environmental impact content over a distributed communication medium, such as the Internet. The system and method may provide a computing device, such as a computer or tablet, which presents a user with a user interface, such as a web browser 110, for interacting with the various components of the system, such as a web server 106 hosting an application and communicatively coupled to a various devices of the system. In operation, a user may access a home screen of a native application on the user's computing device or a landing page of a website, at which the user may input login information.

In some embodiments, information regarding the source organization's socio-economic and/or environmental activities and socio-economic and/or environmental data may be gathered from a source organization being modeled and/or other entities associated with the source organization. Entities that may provide information could include the source organization, vendors upstream and/or downstream from the source organization in the supply chain, and an upstream/downstream vendor's employees. With regards to the source organization, the source organization may utilize login credentials supplied by the system in order to securely access the website hosted on the webserver 106 and then upload data via a file upload process.

The file upload process may include automated or manual processes permitting the source organization to input data into the system via the hosted website. For example, the source organization may input data directly into fields of an HTML, form, or a spreadsheet file may be uploaded and parsed by the webserver 106 or other device of the system. The data may be logically segmented into fields containing information or characteristics associated with each upstream and/or downstream vendor or supplier. These data fields associated with vendors may include a vendor or supplier name, certification type (e.g., women-owned, minority-owned, veteran-owned, hub zone, Native American-owned, LGBT-owned, 8A certified, SDB certified, disadvantaged business certified or no classification), vendor's/supplier's principal place of doing business location (state, city and zip code), and the specific annual amount spent with each supplier, among others.

When a user associated with the source organization arrives at the website, the user may proceed through the authentication process, and then the file-compatibility process to determine whether any input data and/or computer files are compatible with the system. Once the user is authenticated and the file-compatibility check passes, a source organization user has completed the required steps for economic impact analysis. Upon completion of source organization upload, a unique identifier code may be created for the source organization. In some cases, a unique identifier code will be created for each of the source organization's upstream/downstream vendors. In some embodiments, a unique survey may be automatically generated for the source organization. The unique survey may contain a unique identifier code associated with the survey and the source organization, and may be used to authenticate individuals accessing or submitting the survey. An email with a unique identifier code will be sent on behalf of the source organization to each source organization's vendors highlighting the types of data needed to complete the survey. After a period of time has passed, the survey link will be created and sent to source organization's vendors. Each source organization's vendor, or associated users (e.g., employees, volunteers) may be required to authenticate themselves by using the unique identifier code associated with the vendor. Once authenticated, the information input by the user of the source organization's vendor may include: vendor name, state of incorporation, state, city and zip of principal place of doing business, total number of employees, total number of employees per gender type (male, female, non-selected), total number of employees per ethnicity type (African American, Asian American, Caucasian American, Hispanic American, Native American, non-selected). The total number of employees per gender type or the total number of employees per ethnicity type are not required fields. Once the user of the source organization's vendor has completed the survey a new survey will be automatically generated. The source organization's vendor will ask their employee to visit the page, enter the unique identifier code and complete the survey.

In some cases, survey fields that are otherwise automatically populated by the system into generated surveys, may be optional fields or omitted from surveys altogether, based on the vendor's preferences and/or the source organization's preferences. For example, it may or may not be required for employees of the vendor or source organization to give their name or any personal information, such as age, gender, ethnicity, salary range, state, city, zip code of residence, and annual expenditure on items such as local fuel purchases, local entertainment, local grocery, local utilities.

A filter 104 software application may comprise a redirect module 118 capable of determining whether a user has a registered account. The filter 104 may reside on any computing device communicatively accessible to the web or application server 106. An authentication control component 108 software application may reside on the web/application server 106, an authentication server 102, or any other computing device communicatively coupled to a web/application server 106. If a user is not associated with a registered account, a registration module 116 may require the user to input certain information and/or login credentials. Upon completion of the registration process, an account is created and the user starts a session.

Once user has been authenticated by the authentication server 102, the user is presented with the option to upload data to the web/application server 106. Data is authenticated for accuracy and the web/application server 106 performs a data compatibility check and then determines whether the data is compatible with the data formatting of previously stored data in a database 122 (e.g., appropriate file type). If the data passes the compatibility check, the data goes through the data upload process as normal. If the compatibility check fails, the system notifies the user of the incompatibility and suggests that user prepares the appropriate file type for upload. Once the data passes the authentication and compatibility process, the data is uploaded to a server web/application server 120. The data is then distributed over a communication medium 124, such as the Internet, to a database 122.

A socio-economic and/or environmental impact content generation service 126, executed by a web/application server 106, may implement hybrid input-output, econometric and environmental models to calculate the unique economic impact of an organization's labor and supply chain resource allocations. The impact content generation service 126 may use data from primary and secondary sources. The socio-economic and/or environmental impact content generation service 126 may perform convolutions of the economic and environmental data, utilizing a statistical model that then summarizes input and output data into a consolidated ratio representing the unique impact sentiment of a specific source organization, vendor or employee. It should be appreciated that the output produced by the socio-economic and/or environmental content generation service 126 is not limited to producing a ratio. The results and/or output of the socio-economic and/or environmental impact content generation service 126 may include a machine-readable computer file containing the calculated results, such as an XML file; the results may be outputted as a ratio, a grade determined by the socio-economic and/or environmental impact content generation service 126 against a predetermined grading scale. The results and output of the socio-economic and/or environmental impact content generation service 126 may be normalized to be easier to read by a human or easier to read by compatible computing services. The outputted results of the socio-economic and/or environmental impact content generation service 126 may be translated to another scale (e.g., decimal, percentage, scalar change), or translated into a different presentation format (e.g., text-based to a graphical representation of the data).

The socio-economic and/or environmental impact content generation service 126 may classify data within a database 122 and may transmit data over a communication medium 124, such as the Internet, from a database 122 to a server 120. When the system detects new data, the server 106 is updated in real time. Data is automatically distributed over a communication medium 124, such as the Internet, to a customized online dashboard residing on server 106 and may be viewed from any electronic device that sends and retrieves data over a communication medium 124, such as the Internet, via a web browser 110. Data is collected and distributed over a communication medium 124, such as the Internet, from the database 122 to a server 106 executing a file architecture module 120. The file architecture module 120 may automatically generate a machine-readable computer file containing an electronic image of text and/or graphics based on the results of the socio-economic and/or environmental impact content generation service 126. In some cases, the computer file may be a file format that presents the text and/or graphics on a user interface such that the visual output on the screen resembles a printed document (e.g., PDF file). This document can be viewed over a communication medium 124, such as the Internet, printed and/or electronically transmitted to a client computing device, such as the workstation of the organization's decision maker.

An web/application server 106 preparing graphical reports may use templates with unique icons, unique illustrations, unique graphs and graphics as well as text and paragraph templates composed of sentence types including sentence templates. The sentence templates may further include variables having corresponding attributes. Each of the templates, sentence templates, and attributes may be hierarchically organized. The template data can be directed to an electronic ticker, an internet-based dashboard, or the template data can automatically produce unique icons, unique illustrations, unique graphics, and text. Each of the formats takes the economic impact data and creates automated graphical content that makes it easier to explain and comprehend economic impact data at a glance.

In an embodiment, the unique graphics uses green, yellow and red colors to indicate ratio changes. Green indicates a higher ratio value, red indicates a lower ratio value and yellow indicates no change. Data is distributed over a communication medium 124, such as the Internet, to an electronic ticker where it is automatically displayed on an electronic ticker. The electronic ticker displays an organization's identifier, such as a five-digit alphanumeric acronym, as well as the organization's logo, the organization's specific impact ratio, an up or down triangle showing whether that ratio is above or below the previous ratio value, the date of the previous ratio period, a number or percentage detailing how much higher or lower the current ratio was than the previous ratio, and/or the geographic area associated with the ratio calculations. The ticker uses colors to indicate ratio changes. Green indicates a higher ratio value, red indicates a lower ratio value and yellow indicates no change. The system and method synthesizes the data and uniquely displays information in a variety of formats enabling people to quickly comprehend socio-economic and/or environmental impact data at a glance.

Figure 2:
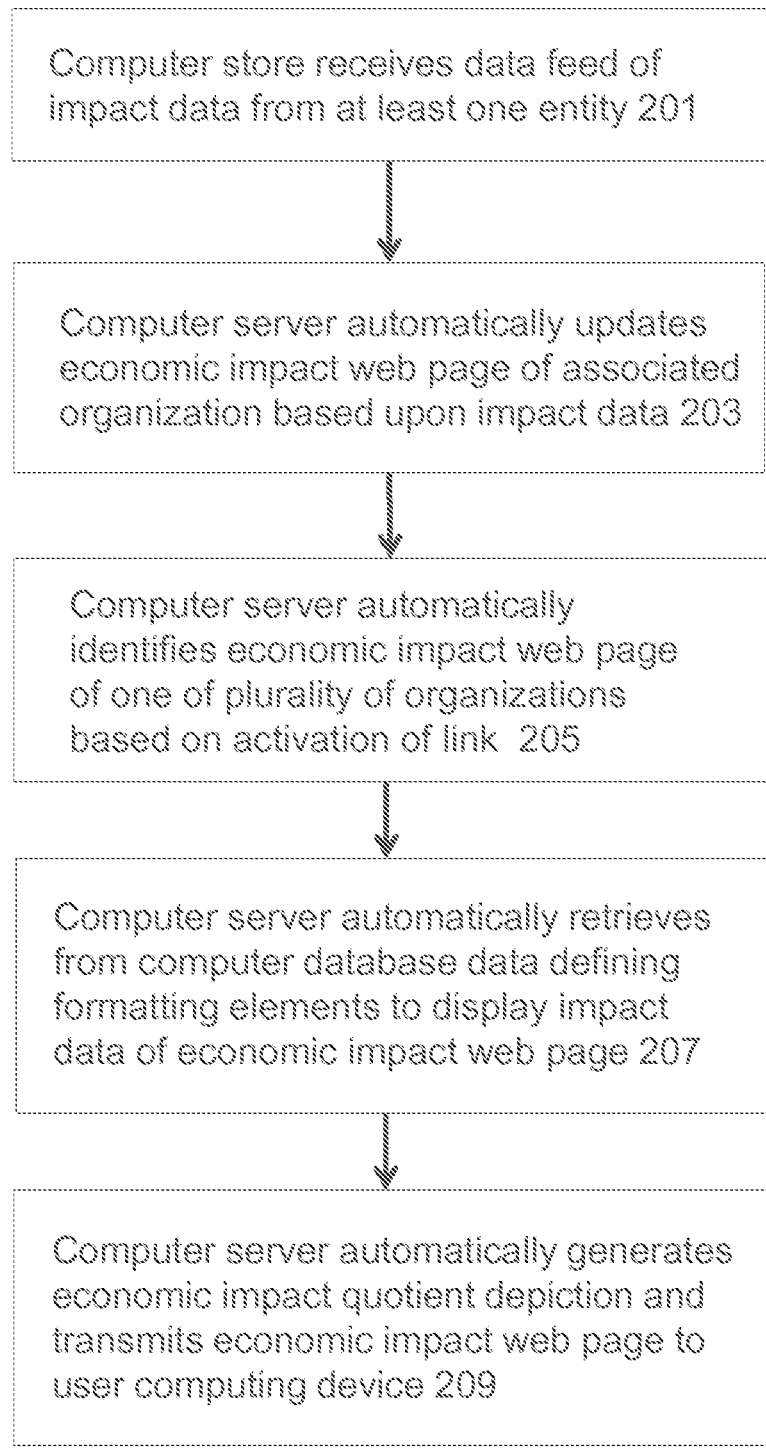
FIG. 2 is a flowchart of a system and method of measuring socio-economic and/or environmental impact and automatically generating graphical socio-economic and/or environmental impact content over a distributed communication medium, such as the Internet, according to an embodiment.

FIG. 2 shows a method for measuring socio-economic and/or environmental impact and automatically generating graphical socio-economic and/or environmental impact content, which may be implementing a system such as that of FIG. 1, including a computer database, and a computer server coupled the computer database. In an embodiment, the computer database contains data, for each of a plurality of socio-economic and/or environmental impact web pages, defining a plurality of formatting elements that are configured to display impact data. In an embodiment, the computer database stores impact data associated with each of a plurality of organizations. At step 201, the computer database receives a feed of impact data from at least one entity. In an embodiment, the computer database receives a data feed of impact data from at least one entity and at least one data source server. In an embodiment, the computer database receives impact data from one of the plurality of organizations, such as impact data relating to transactions from that organization with one or more of its vendors. In an embodiment, the at least one entity includes one or more vendor of one of the organizations. The impact data received from a vendor of the organization may include one or more of socio-economic and/or environmental data, employee data, and locality data of the vendor. In an embodiment, step 201 communicates to a vendor of one of the organizations a survey form, such as an online survey form, to be completed and returned by the vendor. In a further embodiment, the impact data includes tax return data received from one or more vendor of one of the organizations. In an embodiment, the computer database receives the feed of impact data from at the least one entity in a standard file format (such as CSV format, TXT format, MDB format, DBF format or XLS format) to facilitate importing the impact data into the computer database.

At step 203, the computer server automatically updates the socio-economic and/or environmental impact web pages of an associated organization based upon the impact data received at step 201. In an embodiment, the computer server automatically updates the socio-economic and/or environmental impact web pages of the associated organization based upon the received impact data, in real time. In another embodiment, the computer server automatically updates the socio-economic and/or environmental impact web pages of the associated organization based upon the received impact data, in a batch process. In an embodiment, the computer server automatically updates the socio-economic and/or environmental impact web pages of the associated organization based upon the received impact data, in a periodic batch process; for example an hourly batch process, or a daily batch process. The present system and method's automatic updating of socio-economic and/or environmental impact web pages of associated organizations based upon received impact data, together with automatic reporting of socio-economic and/or environmental impact data, represent a significant advance over conventional socio-economic and/or environmental impact reporting procedures.

At step 205, the computer server automatically identifies a socio-economic and/or environmental impact web page of one of a plurality of organizations, based upon activation of a web page link. In an embodiment, the computer server receives from a web browser of a user computing device an indication that a link has been activated on a web page that requests identification of one of the plurality of organizations. In response to this indication, the computer server automatically identifies the socio-economic and/or environmental web page associated with the one of the plurality of organizations identified by the request.

As step 207, the computer server automatically retrieves from the computer database data defining formatting elements that are configured to display impact data for the socio-economic and/or environmental impact web page identified at step 205. In an embodiment, the socio-economic and/or environmental impact web page includes a socio-economic and/or environmental impact quotient depiction representing the socio-economic and/or environmental impact of resource allocations of the associated one of the plurality of organizations. Various examples and types of formatting elements that that are configured to display impact data for the socio-economic and/or environmental impact web page are described herein. These include for example formatting elements configured to generate socio-economic and/or environmental impact quotient depictions; formatting elements configured to display other graphical socio-economic and/or environmental impact content (e.g., charts or graphs); and formatting elements configured to display non-graphical socio-economic and/or environmental impact content (e.g., text display formats such as tables and lists).

At step 209, the computer server automatically generates a socio-economic and/or environmental impact quotient depiction, for inclusion in the identified socio-economic and/or environmental impact web page for the associated one of the organizations. The computer server transmits the socio-economic and/or environmental impact web page, formatted to include the socio-economic and/or environmental impact quotient depiction, to the user computing device that provided the request of step 205.

In an embodiment, the system and method for measuring socio-economic and/or environmental impact and automatically generating graphical economic impact content uses standard formulas based upon economic impact data obtained from the system, and other data sources, to provide the total economic impact ratio of the SGA (Selling, General & Administrative) costs of a corporation on the local communities.

The first formula calculates Economic Impact Ratio:

$$\text{Economic Impact Ratio} = \frac{SVS + VSILI + VELS}{SVS}$$

Where:

SVS=Source Vendor spending

VSILI=Vendor Source Income Local Impact

VELS=Vendor Employees Local Spending

The second formula calculates Vendor Source Income Local Impact Ratio:

$$\text{Vendor Source Income Local Impact Ratio } (VSILIR) = \frac{VLSGAE \times SVS}{VGR}$$

Where:

VLSGAE=Vendor Local SGA Expenses

VGR=Vendor Gross Revenue

The third formula calculates Vendor Source Local Water Ratio:

$$\text{Vendor Source Local Water Ratio } (VSLWR) = \frac{VLSGAE \times SVS \times WU}{VGR}$$

Where:
VLSGAE=Vendor Local SGA Expenses (water usage cost not factored into SGA expense)
WU=Vendor Water Usage Expense The fourth formula calculates Vendor Source Local Solid Waste Disposal Ratio:

$$\text{Vendor Source Local Solid Waste Disposal Ratio } (VSLSWDR) = \frac{VLSGAE \times SVS \times WDU}{VGR}$$

Where:
VLSGAE=Vendor Local SGA Expenses (solid waste disposal cost not factored into SGA expense)
WDU=Vendor Waste Disposal Expense The fifth formula calculates Vendor Source Local Recycled Waste Ratio:

$$\text{Vendor Source Local Recycled Waste Ratio } (VSLRW) = \frac{VLSGAE \times SVS \times RWU}{VGR}$$

Where:
VLSGAE=Vendor Local SGA Expenses (recycling cost not factored into SGA expense)
RWU=Vendor Recycled Waste Expense The sixth formula calculates Vendor Employees Local Spending:

$$\text{Vendor Employees Local Spending } (VELS) = \frac{SVS \times ESTS}{VGR}$$

Where:
ESTS=Employees Summary Total Spending

Figure 3:
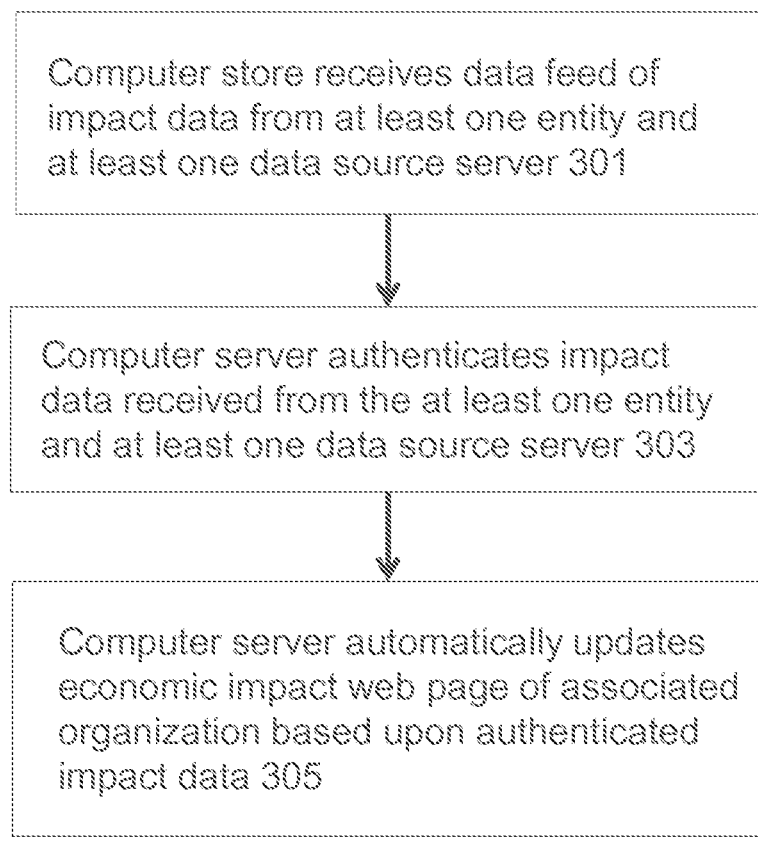
FIG. 3 is a flowchart of a system and method of measuring socio-economic and/or environmental impact and automatically receiving and authenticating impact data for use in generating graphical socio-economic and/or environmental impact content over a distributed communication medium, such as the Internet, according to an embodiment.
Figure 4:
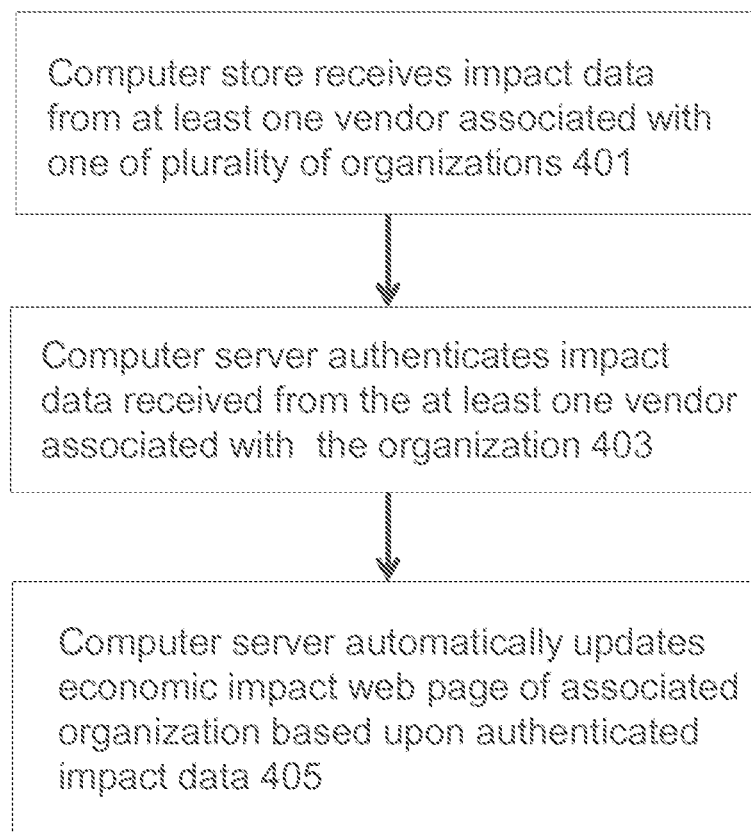
FIG. 4 is a flowchart of a system and method of measuring socio-economic and/or environmental impact and automatically receiving and authenticating impact data for use in generating graphical socio-economic and/or environmental impact content over a distributed communication medium, such as the Internet, according to an embodiment.

FIG. 3 and FIG. 4 show variations of a process for receiving impact data at the computer database, and for automatically updating the socio-economic and/or environmental impact web page of an associated organization based upon received impact data. At step 301 of the method of FIG. 3, the computer database receives a data feed of impact data from at least one entity and at least one data source server. At step 303, the computer server authenticates the impact data as a preliminary to updating the computer database with the impact data. For example, the computer server may authenticate impact data received from one source, such as vendor responses to a survey form, with confirmatory data, such as vendor tax return data. At step 305, following authentication of the impact data, the computer server automatically updates the socio-economic and/or environmental impact web page of an associated organization based upon authenticated impact data.

At step 401 of the method of FIG. 4, the computer database receives impact data from at least one vendor associated with one of the plurality of organizations. At step 403, the computer server authenticates the impact data as a preliminary to updating the computer database with the impact data. For example, the computer server may authenticate impact data received responses of the at least one vendor to a survey form, with confirmatory data, such as tax return data of the at least one vendor. At step 405, following authentication of the impact data, the computer server automatically updates the socio-economic and/or environmental impact web page of the associated organization based upon the authenticated impact data.

Figure 9:
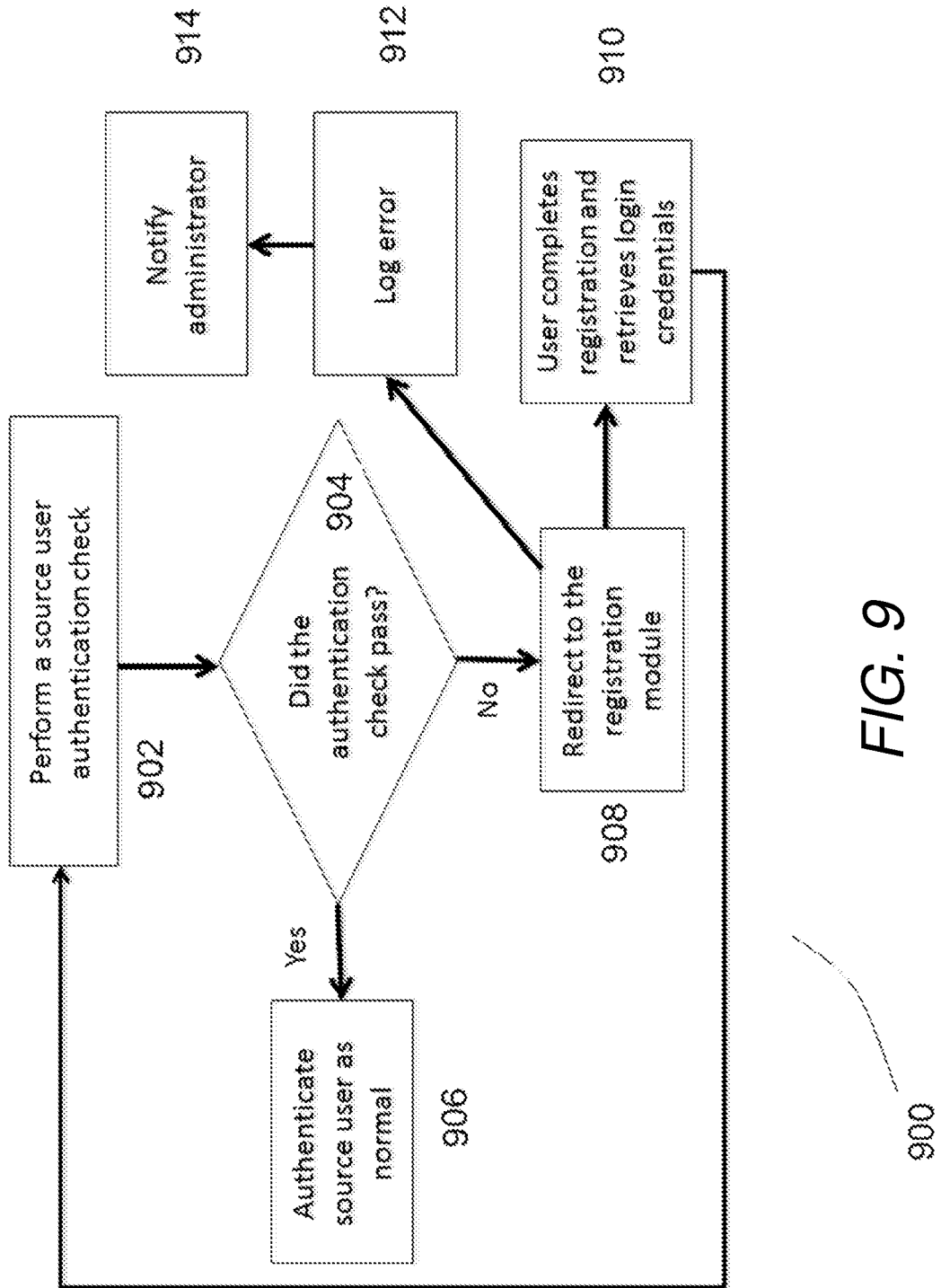
FIG. 9 is a flowchart illustrating a source organization user authentication feature of the system and method, according to an embodiment.
Figure 11:
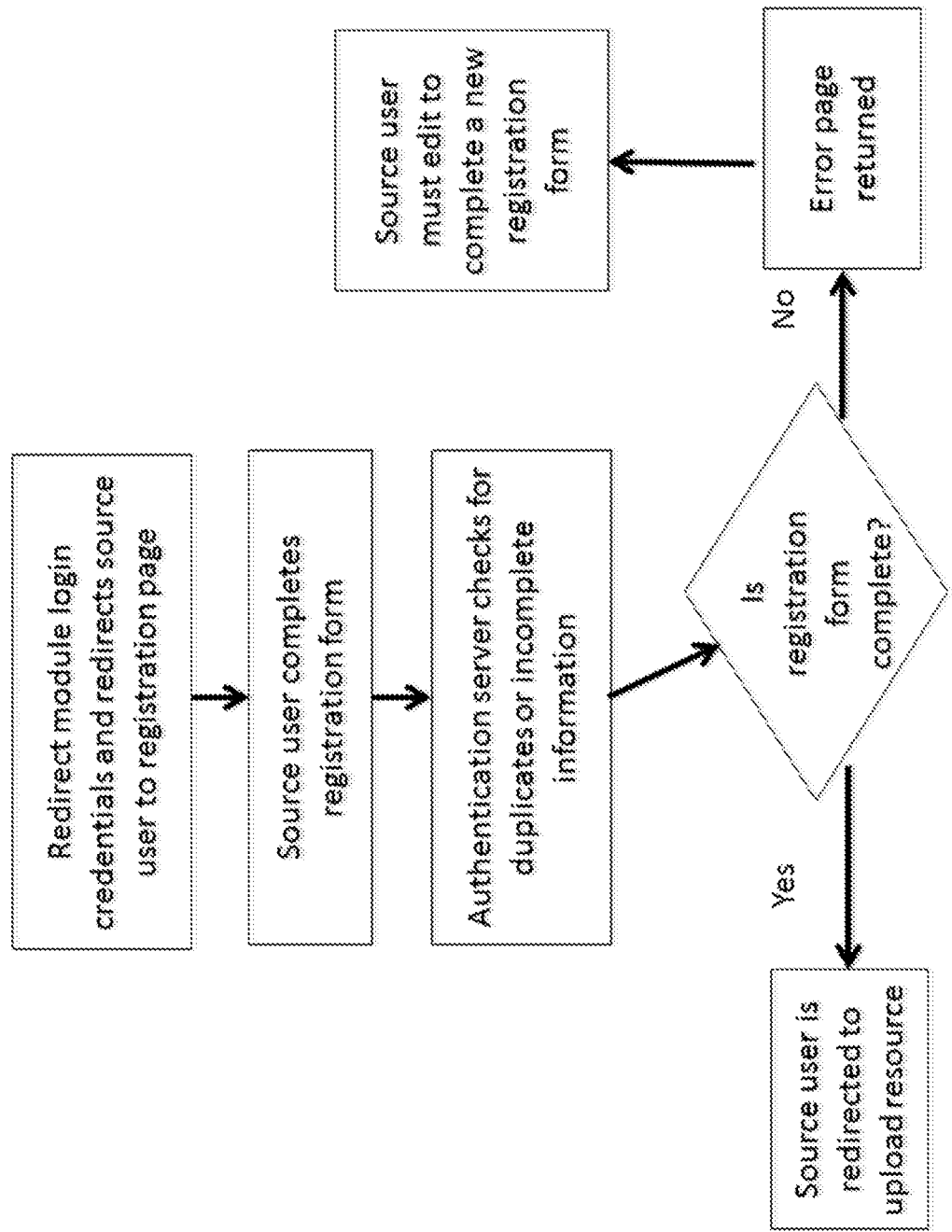
FIG. 11 is a flowchart illustrating a source organization user authentication feature of the system and method, according to an embodiment.

FIG. 9 is a flowchart illustrating a source entity user authentication method 900 of the present system and method, according to an embodiment. In an embodiment, the source user is associated with an entity, also herein called source organization, which is a source of socio-economic and/or environmental impact data for the present system and method. At 902, the method performs an authentication check of a source user. At 904, the method determines whether the user passes the authentication check. If the user passes the authentication check at 906, the system recognizes the source user and permits access to the system. If the user fails the authentication check at 908, the system redirects the source user to redirect module 118 wherein the source user may register with the system and retrieve login credentials at 910. At 912, 914 upon authentication failure of the source user, the method logs the authentication error and notifies the system administrator. FIG. 11 shows exemplary method steps for redirecting and registering a user, corresponding to the steps 908, 910 of FIG. 9.

Figure 10:
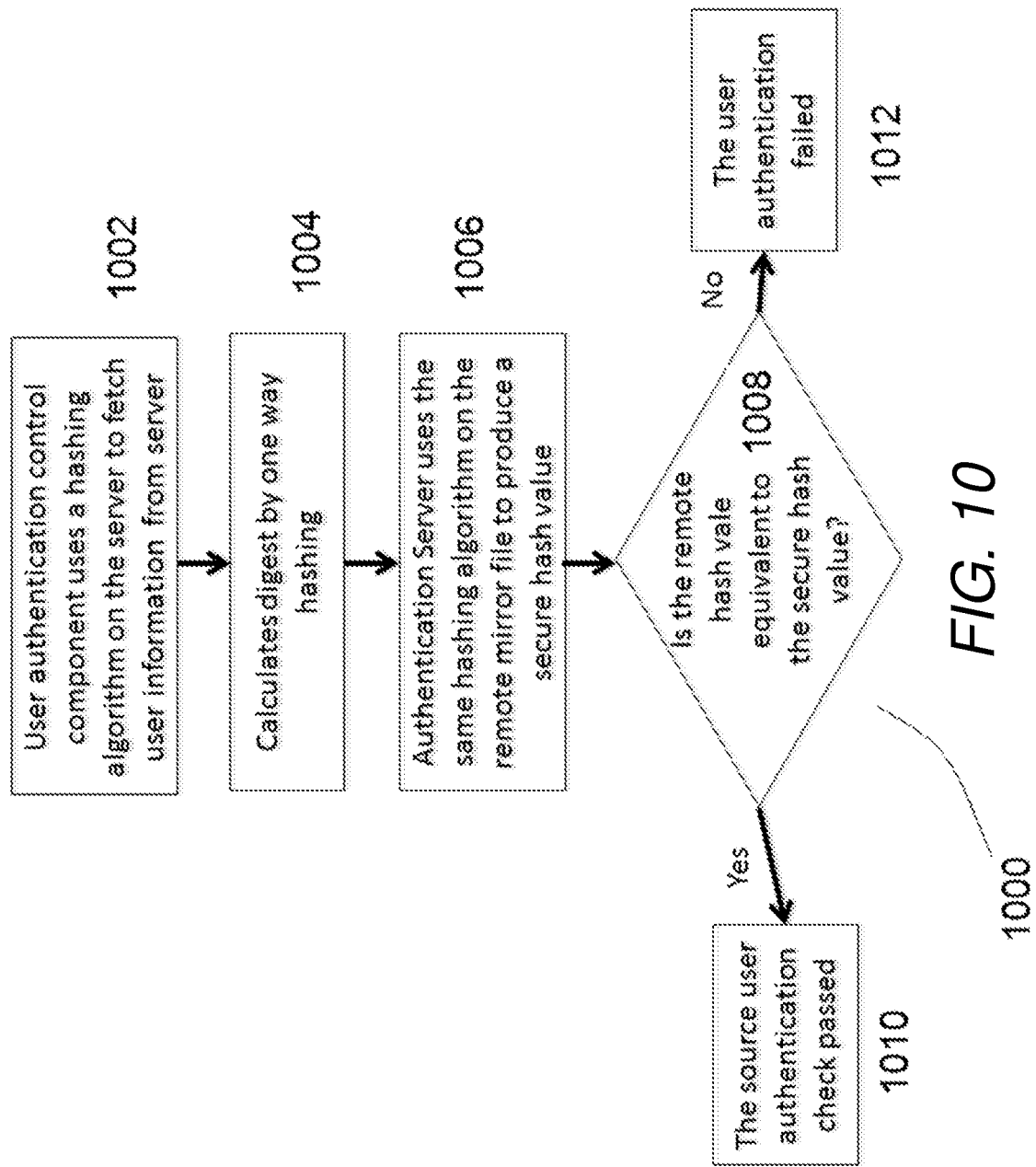
FIG. 10 is a flowchart illustrating a source organization user authentication feature of the system and method, according to an embodiment.

FIG. 10 is a flowchart illustrating a source organization user authentication method 1000, according to an embodiment. The method 1000 also may be used to authenticate other types of user, such as vendor users. At 1002 the user authentication module of the system uses a hashing algorithm to fetch user information from the user. At 1004 the system calculates a digest using a one way hashing algorithm. At 1005 the system uses the same hashing algorithm on a remote mirror file to produce a secure hash value. At 1008 the system determines whether the remote hash value is equivalent to the secure hash value. Successful match of these values authenticates the user at 1010, while failure to match these values results in user authentication failure at 1012.

Figure 12:
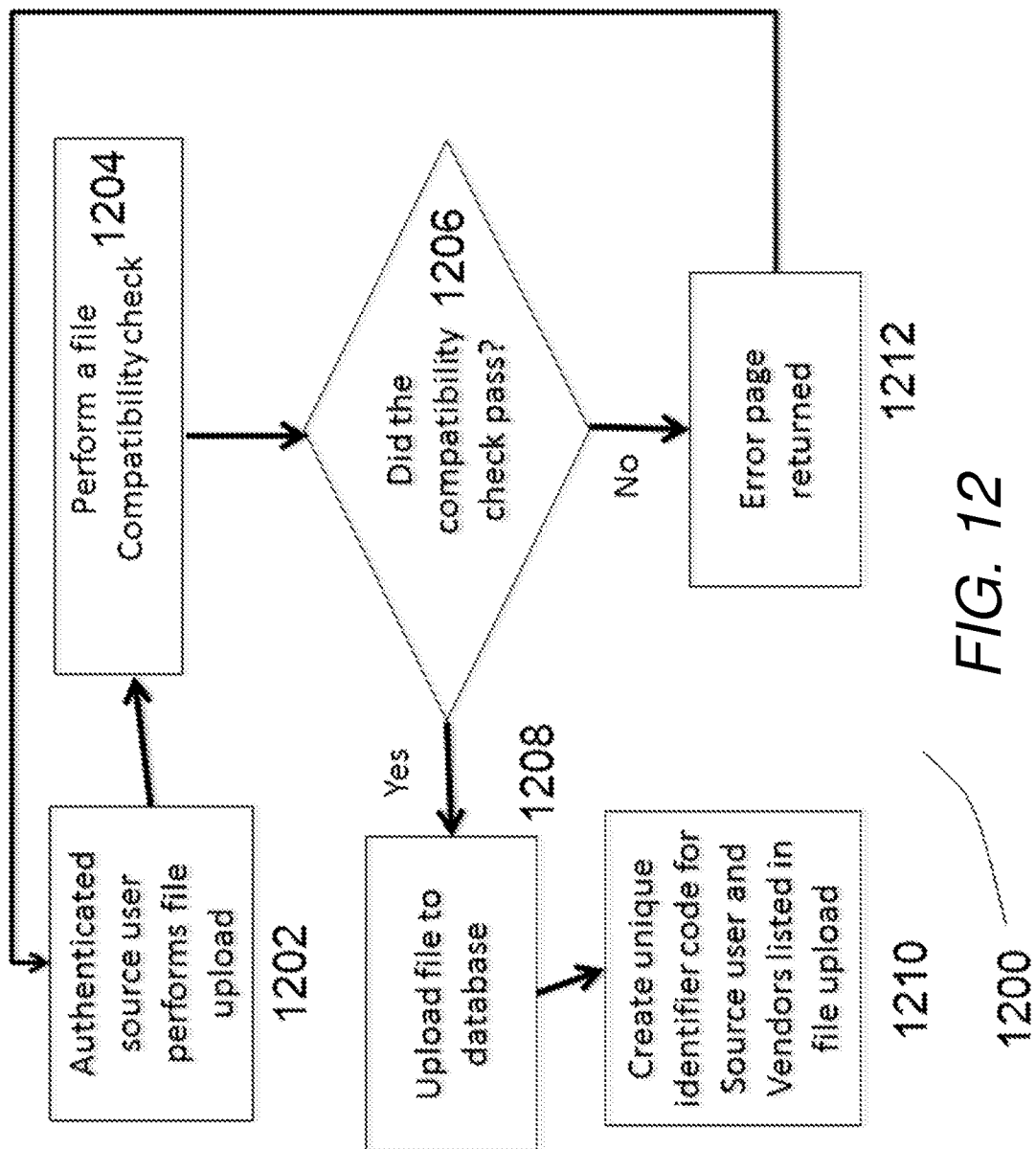
FIG. 12 is a flowchart illustrating a file intake process of socio-economic and/or environmental impact data from an authenticated source organization user of the system and method, according to an embodiment.

FIG. 12 is a flowchart illustrating a file intake method 1200 for receiving socio-economic and/or environmental impact data from an authenticated source organization user. At 1202 the authenticated source user uploads a file to the system. At 1204 the system performs a file compatibility check. If the uploaded file passes the compatibility check at 1206, the system uploads 1208 the file to computer database 122. At 1210 the system creates unique identification codes for the source user, and for vendors listed in the file upload. If the uploaded file fails the compatibility check at 1206, the system returns an error page 1212 that is displayed to the source user.

Figure 13:
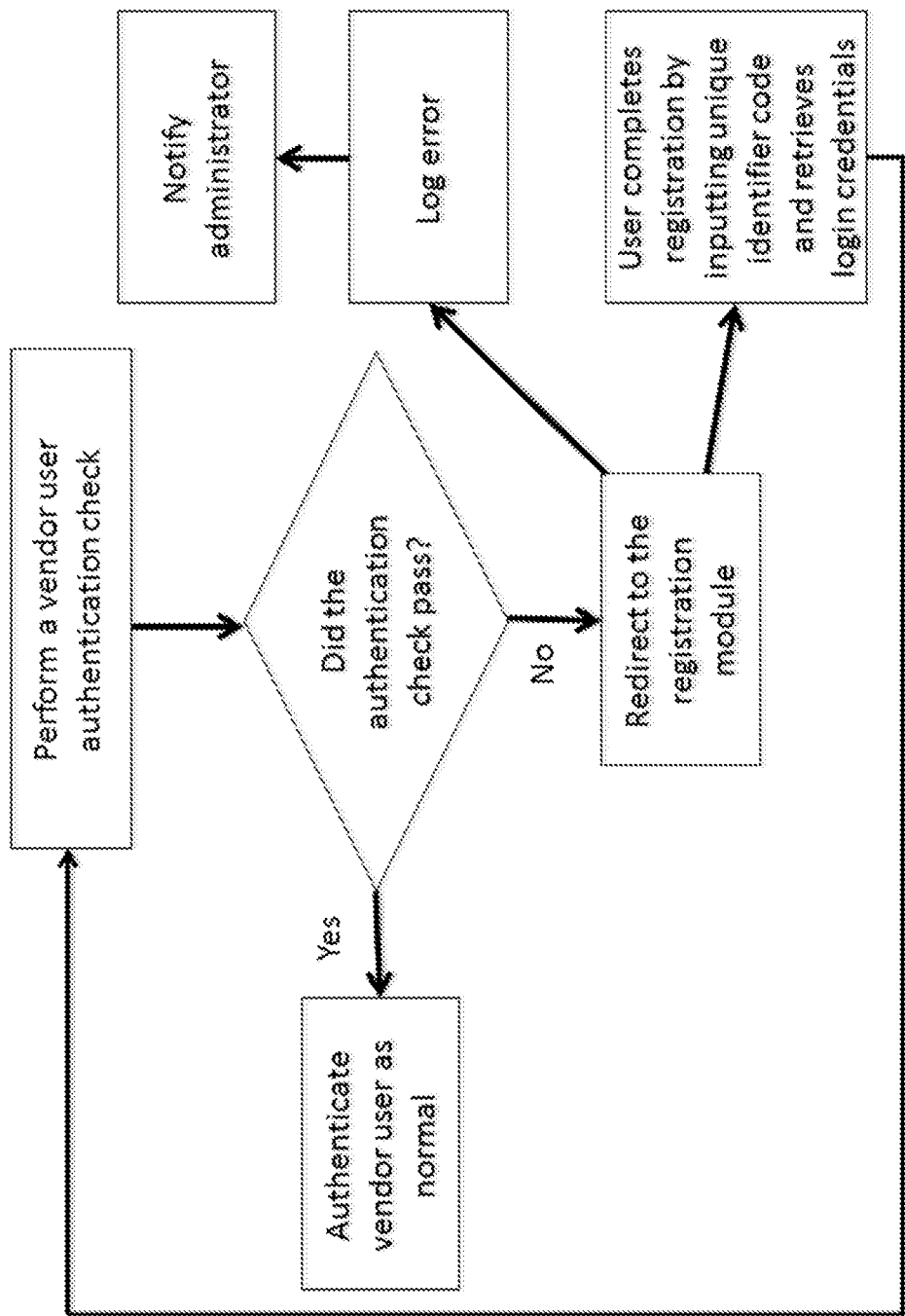
FIG. 13 is a flowchart illustrating a vendor user authentication feature of the system and method, according to an embodiment.

FIG. 13 is a flowchart illustrating a vendor user authentication method for a vendor user. This method may be similar to a user authentication method for a source organization user, such as the method 900 of FIG. 9. Additional security may be provided for authentication of vendor users, such as the use of hashing algorithms as shown in FIG. 10.

Figure 14:
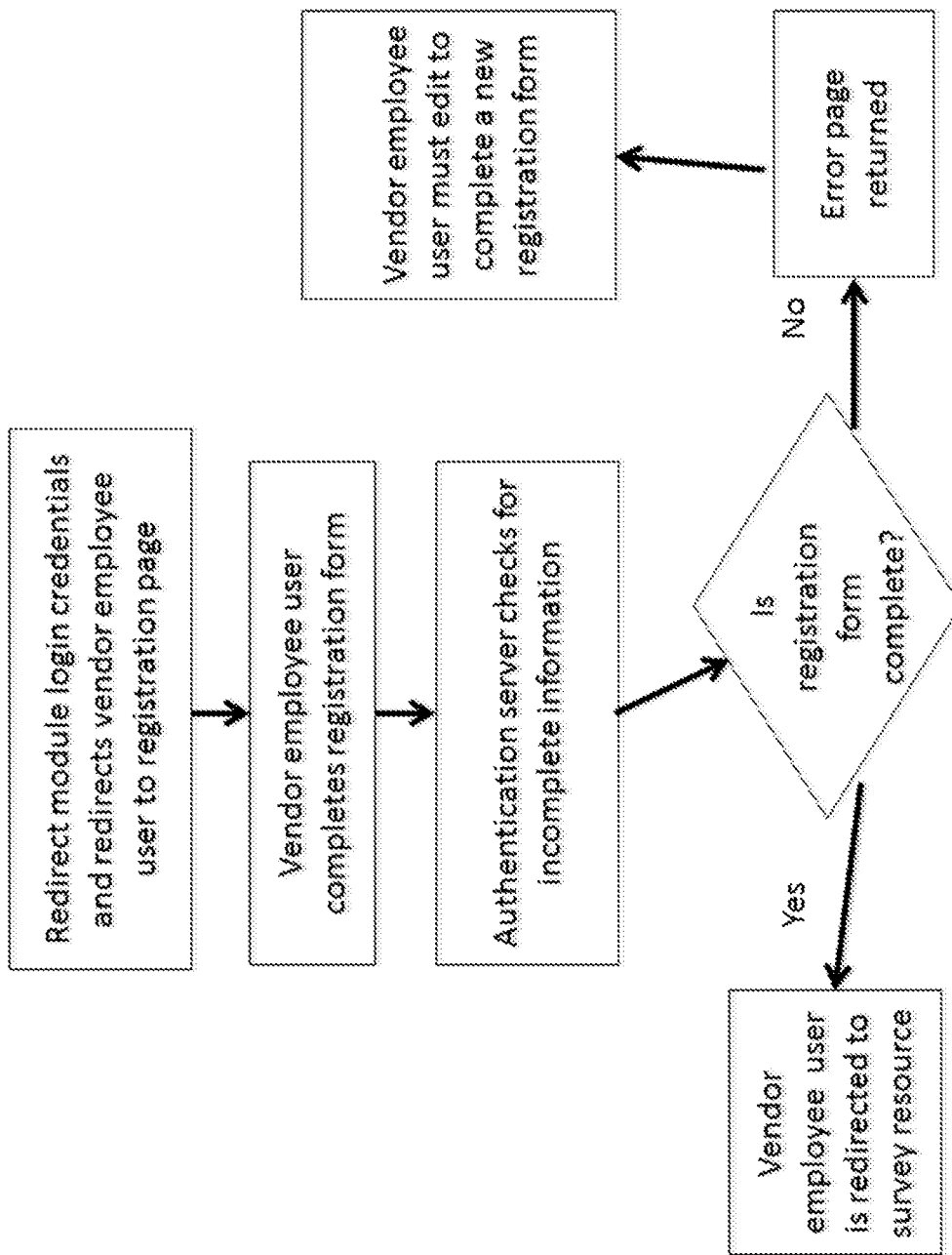
FIG. 14 is a flowchart illustrating a file intake process of socio-economic and/or environmental impact data from an authenticated vendor user of the system and method, according to an embodiment.

FIG. 14 is a flowchart illustrating routing of a successfully authenticated vendor user to a resource of the system designed to receive economic impact data from the vendor user. A vendor user is a representative or agent of a vendor of one of the organizations and may include a vendor employee, although vendor employees are considered a special category of source user as shown e.g., in FIG. 15. In the embodiment of FIG. 14, the authenticated vendor user is forwarded to a survey resource, which may be a web form for display on a user computing device of the vendor user. The web form may include fields to receive economic data, such as sales, revenues, purchases, etc.; employee data, such as employee roster, payroll data, hire dates, termination dates, etc.; environmental data, such as water usage and solid waste disposal data; and locality data, such as zip codes and other local, state, or regional data. These data may be provided for a vendor facility or where appropriate, for multiple vendor facilities. The system may employ other or additional resources besides survey forms to obtain socio-economic and/or environmental impact data from vendor users and other users.

Figure 15:
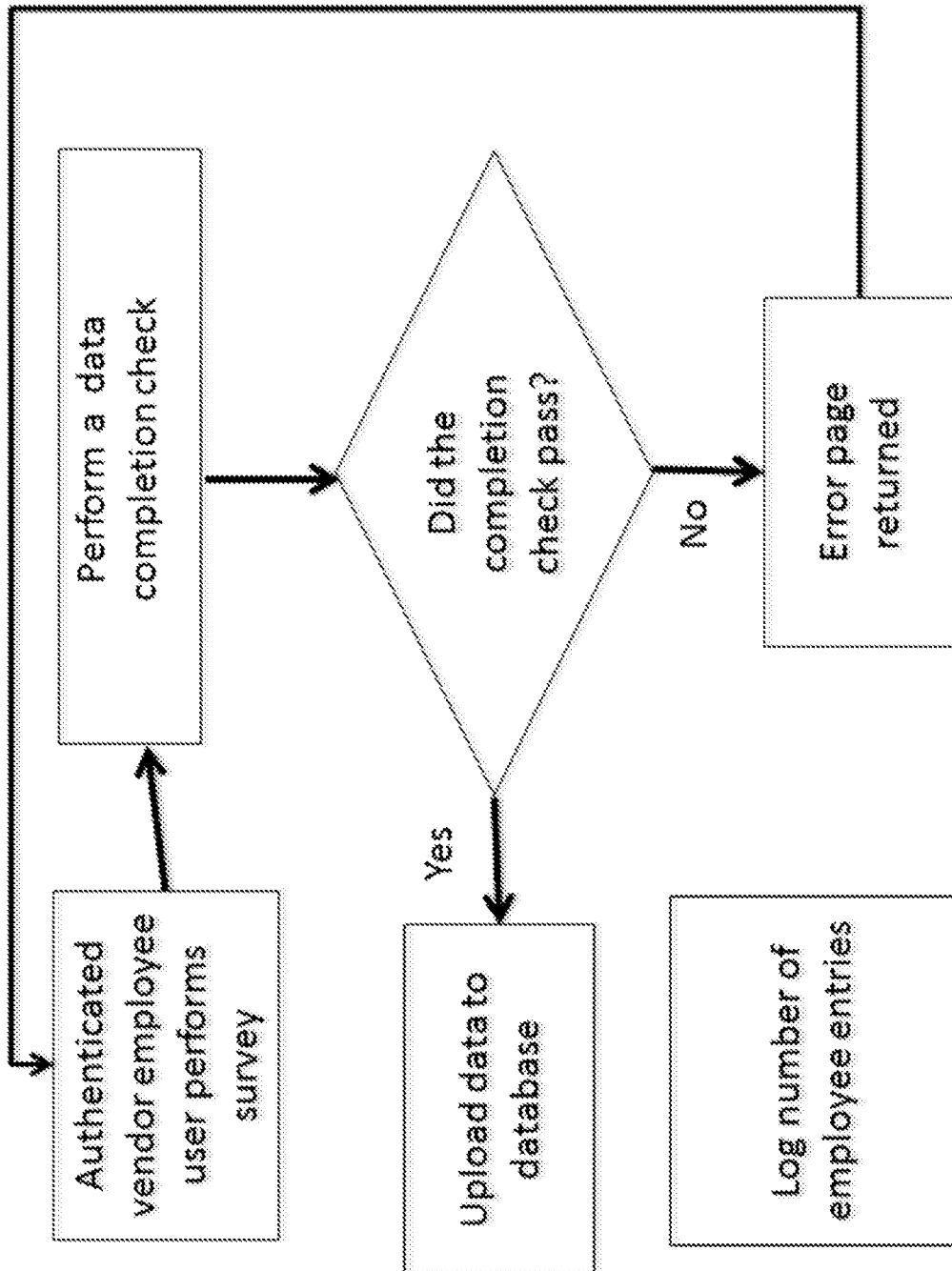
FIG. 15 is a flowchart illustrating a file intake process of socio-economic and/or environmental impact data from an authenticated vendor employee of the system and method, according to an embodiment.

FIG. 15 is a flowchart showing the direction of an authenticated vendor employee to a system resource designed to receive socio-economic and/or environmental impact data from the vendor employee. The resource may be a survey form that includes fields appropriate to vendor employees. In collecting this type of survey response, the system may log the number of employee entries.

Figure 16:
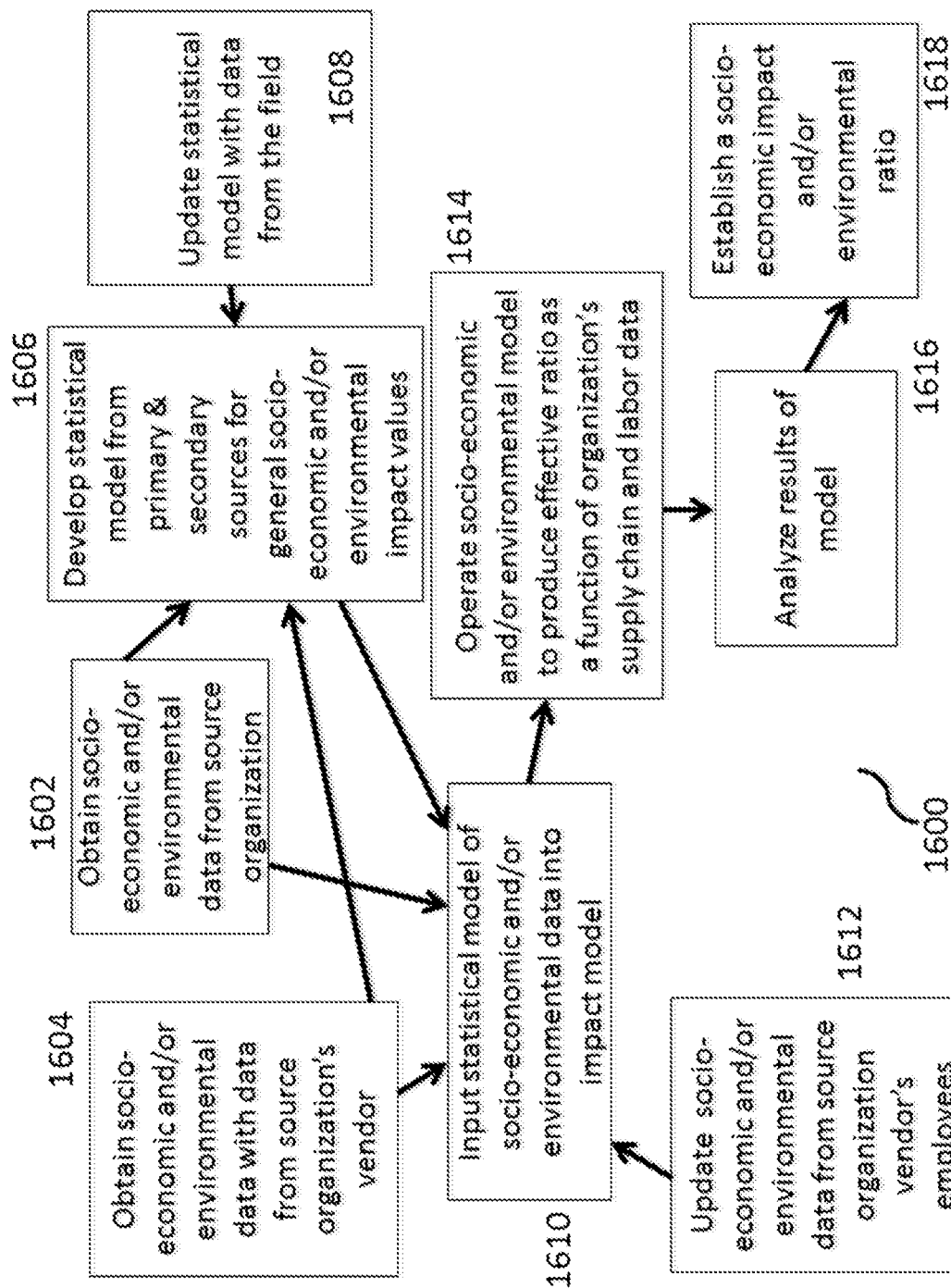
FIG. 16 is a diagrammatical representation of a socio-economic and/or environmental model to measure the socio-economic and/or environmental impact of an organization's supply chain and labor resource allocations, according to an embodiment.

FIG. 16 is a diagrammatical representation of an economic model 1600 to measure the socio-economic and/or environmental impact of an organization's supply chain and labor resource allocations. The system obtains socio-economic and/or environmental impact data from the source organization at 1602, and obtains socio-economic and/or environmental impact data from one or more vendor of the source organization at 1602. At 1606 the method develops a statistical model from this socio-economic and/or environmental impact data and from other primary and secondary sources. This statistical model is dynamic, and may be updated with data 1608 received from the field. The statistical model includes general socio-economic and/or environmental impact values. At 1610 the statistical model data is input into an economic impact model (also called economic model). This economic model also may obtain socio-economic and/or environmental impact data from vendor employees 1612. At 1614 the system operates the economic model to produce an effective ratio (i.e., a preliminary multiplier used to establish an impact ratio) as a function of the organization's supply chain and labor data. The system then analyzes the results of the model 1616, to generate a socio-economic and/or environmental impact ratio at 1618. Like the statistical model, the economic model and the impact ratio generated using the model, also are dynamic and may be updated in real time as updated impact data is received from the field 1608.

Figure 17:
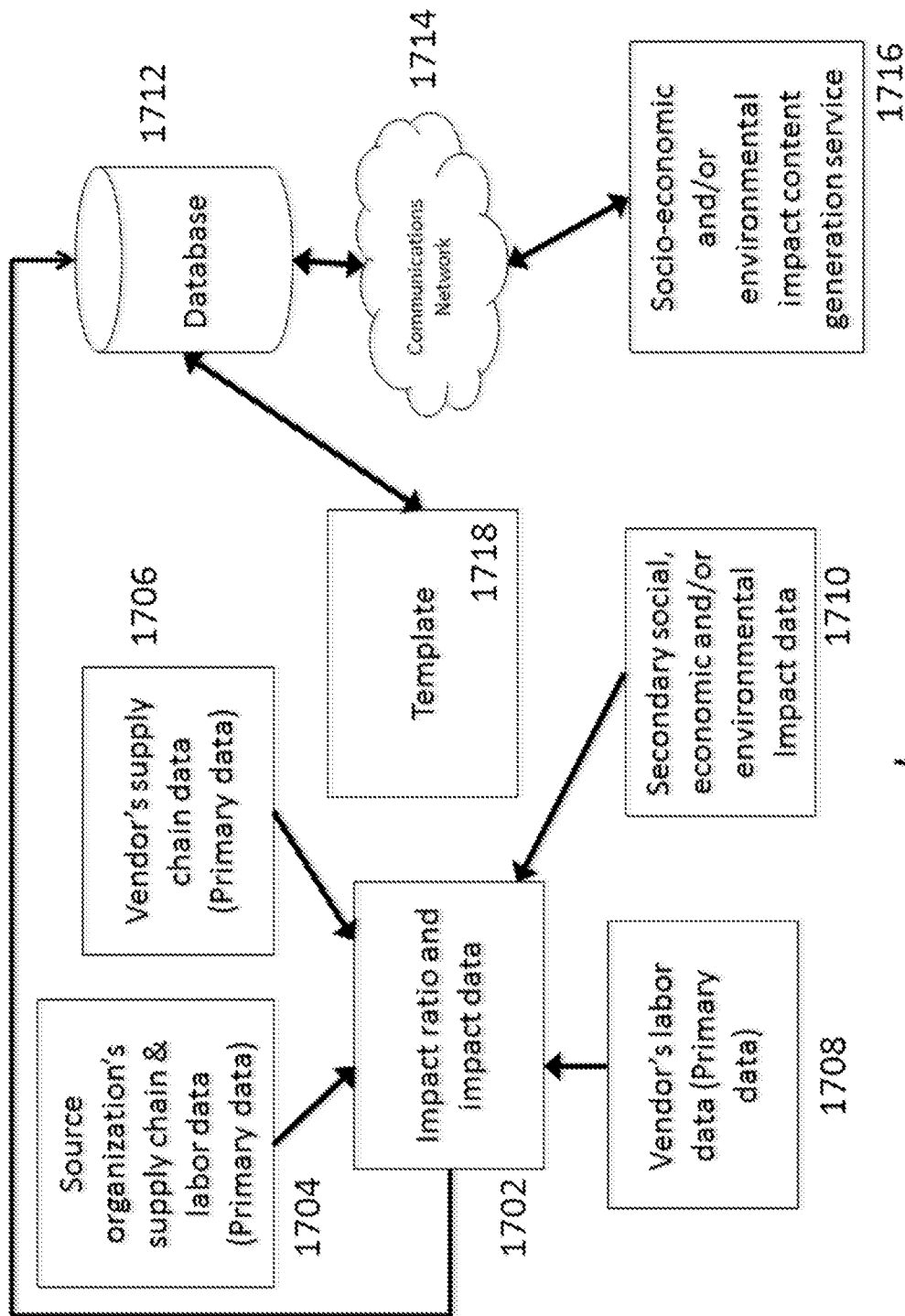
FIG. 17 is a block diagram depicting an illustrative operating environment in which a socio-economic and/or environmental impact content generation service prepares content regarding identified items of interest based upon a hierarchically organized template, according to an embodiment.

FIG. 17 is a block diagram of an illustrative operating environment for a socio-economic and/or environmental impact content generation service. In an embodiment, the socio-economic and/or environmental impact content generation service prepares socio-economic and/or environmental impact content reports regarding identified items of interest based upon stored templates. At 1702 the system obtains impact ratios and other socio-economic and/or environmental impact data from various sources, and stores this data in computer database 1710. A template module 1716 contains templates used by socio-economic and/or environmental impact content generation service 1714 in automated reporting of socio-economic and/or environmental impact content. For example, these templates may be used in text-based and graphical representations of the socio-economic and/or environmental impact data. In an embodiment, the templates module stores templates in a hierarchical data structure.

Figure 18:
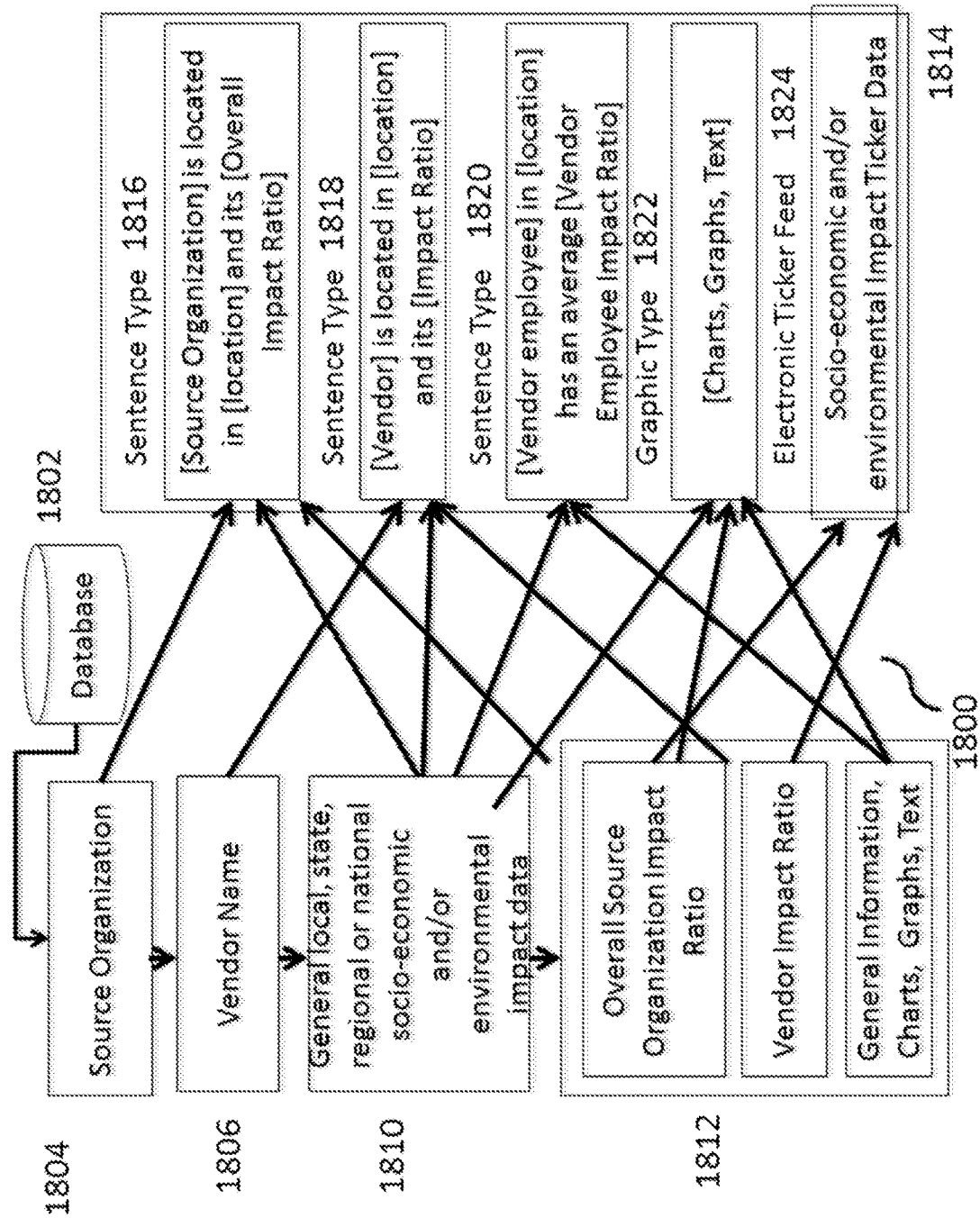
FIG. 18 is a schematic illustration of templates obtained by the socio-economic and/or environmental impact content generation service, according to an embodiment.

FIG. 18 is a schematic illustration of the use of templates by an socio-economic and/or environmental impact content generation service 1800. Database 1802 provides socio-economic and/or environmental impact data for a source organization 1804, and one or more vendor 1806. The socio-economic and/or environmental impact data may have different locality or geographic scope, such as local, state, regional, or national impact data 1810. Using templates module 1818, this impact data may be used to generate socio-economic and/or environmental impact data in a variety of report formats 1812. In various embodiments, content types and reporting formats can include various socio-economic and/or environmental impact ratios, such as overall source organization impact ratio; vendor impact ratio; vendor employee impact ratio. In an embodiment, these impact ratios are displayed using socio-economic and/or environmental impact quotient depictions. For example, the socio-economic and/or environmental impact quotient depictions may provide visually distinctive representations of increasing, decreasing, or unchanged value of one or more of these impact ratios. Additionally, the reports may include a variety of formats for reporting general information, such as charts, graphs, and text.

Exemplary templates of the template module 1814 include sentence type templates 1816, 1818, and 1820 with various sentence formats for text reporting of different socio-economic and/or environmental impact data. Graphic templates 1822 can include for example standard charts, graphics, and included text. Electronic ticker feed templates 1824 provide distinctive visualizations of socio-economic and/or environmental impact data such as socio-economic and/or environmental impact ratios, and trends in the socio-economic and/or environmental impact ratios.

Figure 5:
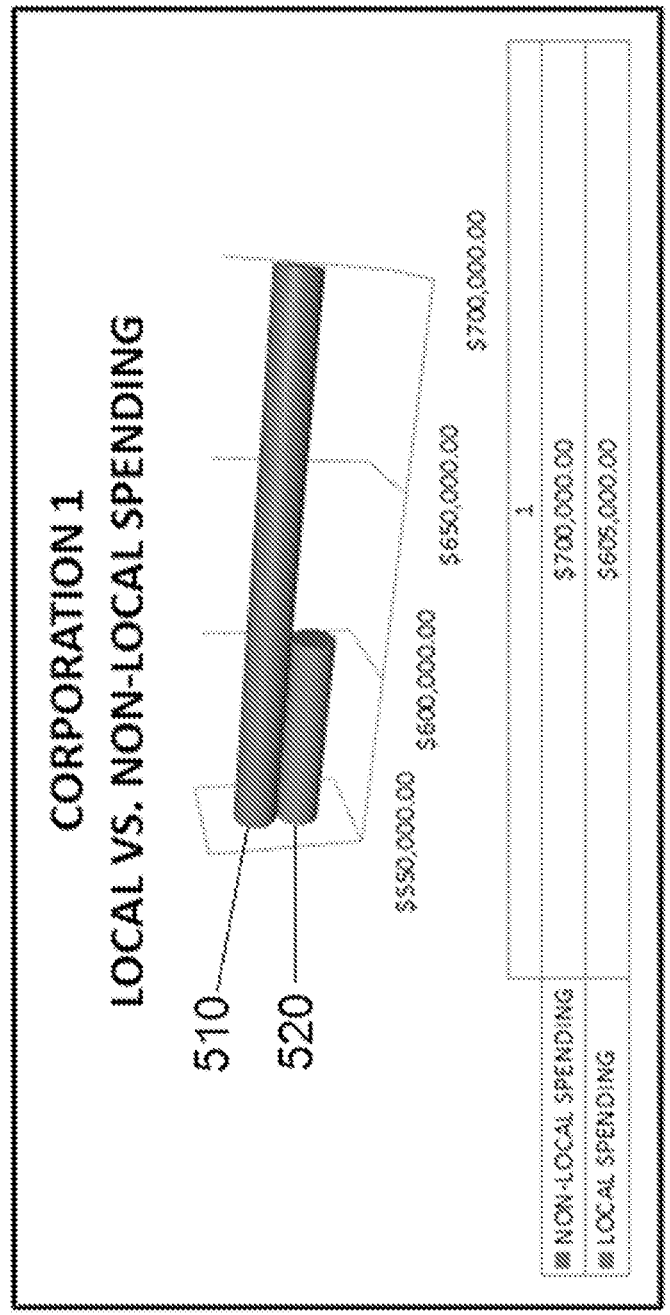
FIG. 5 is a chart of local and non-local spending of an organization, from a report including graphical socio-economic and/or environmental impact content for the organization, as generated over a distributed communication medium, according to an embodiment.

EXAMPLE: The following example reports the results of a socio-economic and/or environmental impact study for an organization named Corporation 1. In reporting results of the study, a set of reports are provided to the organization in the form of tables and charts generated by a socio-economic and/or environmental impact content generation service through automated use of various graphic templates. FIG. 5 shows in a bar chart 500, with an included table, total Non-Local Spending of $700,000 (truncated bar 510) and total Local Spending of $605,000 (truncated bar 520) for Corporation 1, under the conditions of the socio-economic and/or environmental impact study.

Figure 6:
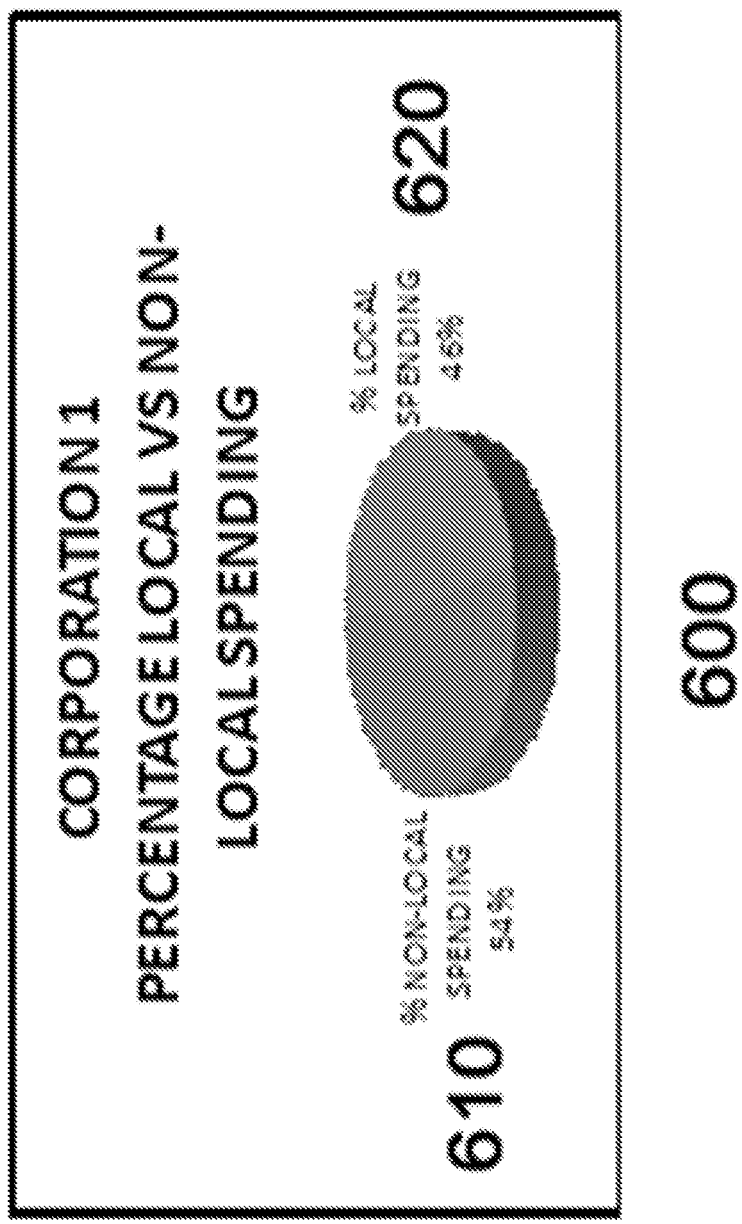
FIG. 6 is a chart of percentage distribution of local and non-local spending of an organization, from a report including graphical socio-economic and/or environmental impact content for the organization, as generated over a distributed communication medium, according to an embodiment.

TABLE 1 shows in tabular form, and FIG. 6 shows in pie chart 600, the percentage distribution of local spending, and of Non-Local Spending, for Corporation 1. Non-Local Spending was 54% of total spending (chart sector 610) and total Local Spending was 46% of total spending (chart sector 620)

TABLE 1

| CORPORATION 1 PERCENTAGE LOCAL vs. NON-LOCAL SPENDING ||
|---|---|
| % LOCAL SPENDING | % NON-LOCAL SPENDING |
| 46% | 54% |

Figure 7:
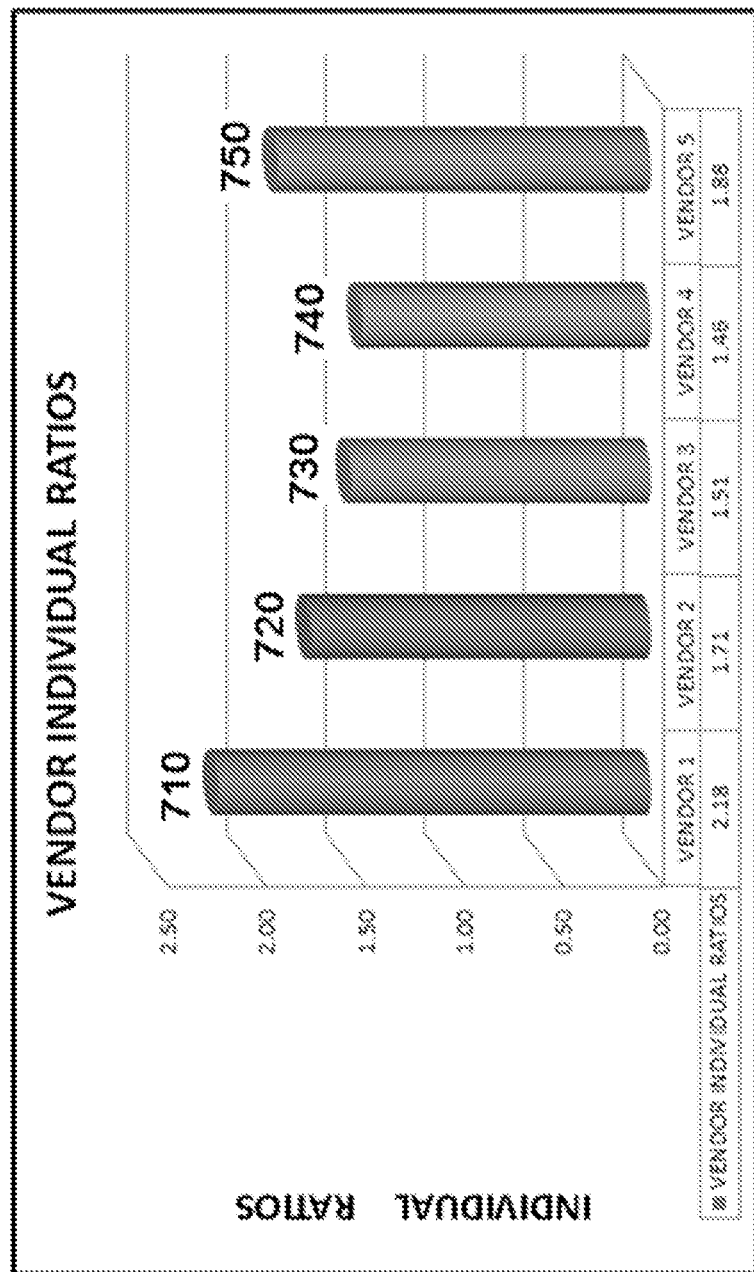
FIG. 7 is a chart of individual socio-economic and/or environmental impact ratios for given vendors of an organization, from a report including graphical economic impact content for the organization, as generated over a distributed communication medium, according to an embodiment.

TABLE 2 shows in tabular form, and FIG. 7 shows in a columnar chart 700, the Economic Impact Ratios by Individual Vendors for Corporation 1. The Economic Impact Ratios 710-750 are charted for Vendor 1, Vendor 2, Vendor 3, Vendor 4, and Vendor 5, respectively, with an overall vendor economic impact ratio of 1.73.

TABLE 2

ECONOMIC IMPACT RATIO CALCULATION INDIVIDUAL VENDORS

| VENDOR | RATIO |
| --- | --- |
| VENDOR 1 | 2.18 |
| VENDOR 2 | 1.71 |
| VENDOR 3 | 1.51 |
| VENDOR 4 | 1.46 |
| VENDOR 5 | 1.88 |
| OVERALL RATIO | 1.73 |

Figure 8:
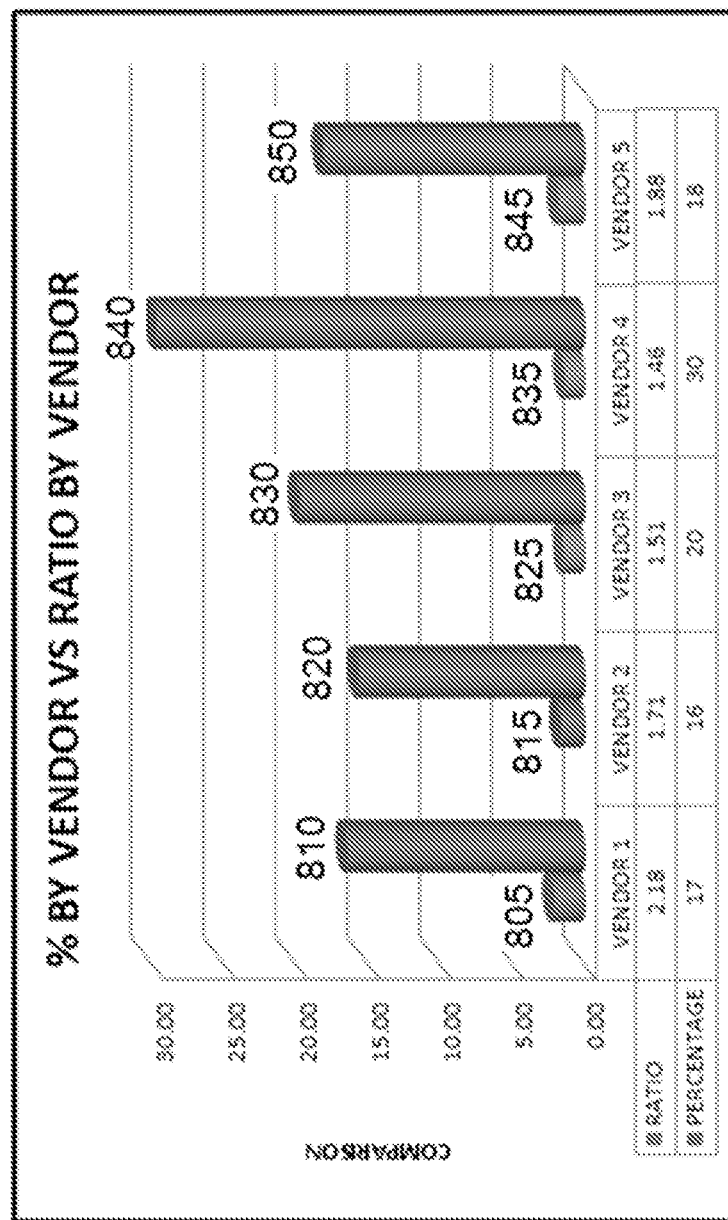
FIG. 8 is a chart of percentage of the total local spending by vendor versus socio-economic and/or environmental impact ratios by vendor of an organization, from a report including graphical economic impact content for the organization, as generated over a distributed communication medium, according to an embodiment.

TABLE 3 shows in tabular form, and FIG. 8 shows in a columnar chart 800, the Economic Impact Ratio Calculation including Percentage by Vendor, and Ratio by Vendor, for the five reported vendors of Corporation 1. Ratios by Vendor 805, 815, 825, 835, and 845; and Percentages by Vendor 810, 820, 830, 840, 850; are charted for Vendor 1, Vendor 2, Vendor 3, Vendor 4, and Vendor 5, respectively.

TABLE 3

ECONOMIC IMPACT RATIO CALCULATION % BY VENDOR vs. RATIO BY VENDOR

| VENDOR | RATIO | PERCENTAGE |
| --- | --- | --- |
| VENDOR 1 | 2.18 | 17 |
| VENDOR 2 | 1.71 | 16 |
| VENDOR 3 | 1.51 | 20 |
| VENDOR 4 | 1.46 | 29 |
| VENDOR 5 | 1.88 | 18 |
| OVERALL | 1.73 | 100% |

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for evaluating impact data including types of socio-economic and/or environmental impact data, the method comprising:
   obtaining via one or more networks, by a computer from an organization database associated with an organization, a data feed containing impact data indicating resource allocations of the organization;
   in response to receiving the data feed, automatically generating, by the computer, one or more impact calculation outputs for the organization based upon the impact data, the one or more impact calculation outputs including one or more updated impact quotients for the organization;
   generating, by the computer, an organization impact file including the one or more impact calculation outputs, the organization impact file comprising one or more formatting elements for displaying an impact calculation output via a graphical user interface;
   in response to activation of a link on a webpage by a user computing device, automatically identifying, by the computer, an organization impact webpage associated with the organization;
   updating, by the computer, the organization impact webpage associated with the organization to include a graphical representation of the one or more updated impact quotients based upon the one or more impact calculation outputs and the one or more formatting elements of the organization impact file; and
   transmitting, by the computer, the organization impact webpage to the user computing device, the organization impact webpage formatted to include the graphical representation of the one or more updated impact quotients according to the one or more formatting elements.

2. The method according to claim 1, wherein generating the organization impact file includes:
   generating, by the computer, an impact calculation output depiction representing the impact calculation output; and
   generating, by the computer, a formatting element containing the impact calculation output depiction for display via the graphical user interface.

3. The method according to claim 1, wherein the organization impact file comprises the organization impact webpage; and
   wherein the method further comprises updating, by the computer, the organization impact webpage based upon the one or more formatting elements according to one or more templates.

4. The method according to claim 1, wherein the one or more formatting elements of the organization impact file are configured to display a graphical representation of organization impact data of a portion of the impact data for the organization indicating one or more resource allocations of the organization.

5. The method according to claim 1, wherein the one or more impact calculation outputs include at least one of an impact ratio or a grade value on a normalized scale.

6. The method according to claim 1, wherein the organization impact file includes at least one of the organization impact webpage, a text file, PDF file, or an XML file.

7. The method according to claim 1, further comprising:
   receiving via the one or more networks, by the computer from a vendor computer, a vendor data feed containing organization impact data of a portion of the impact data of the organization; and
   storing, by the computer into a second database, the organization impact data for the organization obtained from the organization database and received from the vendor computer.

8. The method according to claim 7, wherein the portion of the impact data received from the vendor data feed includes at least one of vendor spending data (SVS), vendor source income local impact data (VSILI), or vendor employee local spending data (VELS); and
   wherein the computer generates the impact calculation output based upon the at least one of the source data spending data (SVS), the vendor source income local impact data (VSILI), or the vendor employee local spending data (VELS).

9. The method according to claim 1, further comprising:
   in response to the computer receiving, from a vendor computer, a vendor data feed containing a portion of the impact data of the organization:
      automatically updating, by the computer, the one or more impact calculation outputs for the organization based upon the portion of the impact data received from the vendor computer; and
      automatically updating, by the computer, the organization impact file based upon the one or more impact calculation outputs as updated based upon the portion of the impact data received from the vendor computer.

10. The method according to claim 1, further comprising generating, by the computer, a second organization impact file having a second file format translated from a first file format of the organization impact file.

11. A system for evaluating impact data including types of socio-economic and/or environmental impact data, the system comprising:
   a computer comprising a processor, configured to:
      obtain via one or more networks, from an organization database associated with an organization, a data feed containing impact data indicating resource allocations of the organization;
      in response to receiving the data feed, automatically generate one or more impact calculation outputs for the organization based upon the impact data, the one or more impact calculation outputs including one or more updated impact quotients for the organization;
      generate an organization impact file including the one or more impact calculation outputs, the organization impact file comprising one or more formatting elements for displaying an impact calculation output via a graphical user interface;
      in response to activation of a link on a webpage by a user computing device, automatically identify an organization impact webpage associated with the organization;
      update the organization impact webpage associated with the organization to include a graphical representation of the one or more updated impact quotients based upon the one or more impact calculation outputs and the one or more formatting elements of the organization impact file; and
      transmit the organization impact webpage to the user computing device, the organization impact webpage formatted to include the graphical representation of the one or more updated impact quotients according to the one or more formatting elements.

12. The system according to claim 11, wherein when generating the organization impact file the computer is further configured to:
   generate an impact calculation output depiction representing the impact calculation output; and
   generate a formatting element containing the impact calculation output depiction for display via the graphical user interface.

13. The system according to claim 11, wherein the organization impact file comprises the organization impact webpage; and
   wherein the computer is further configured to update the organization impact webpage based upon the one or more formatting elements according to one or more templates.

14. The system according to claim 11, wherein the one or more formatting elements of the organization impact file are configured to display a graphical representation of organization impact data of a portion of the impact data for the organization indicating one or more resource allocations of the organization.

15. The system according to claim 11, wherein the one or more impact calculation outputs include at least one of an impact ratio or a grade value on a normalized scale.

16. The system according to claim 11, wherein the organization impact file includes at least one of the organization impact webpage, a text file, PDF file, or an XML file.

17. The system according to claim 11, wherein the computer is further configured to:
   receive via the one or more networks, from a vendor computer, a vendor data feed containing organization impact data of a portion of the impact data of the organization; and
   store, into a second database, the impact data for the organization obtained from the organization database and received from the vendor computer.

18. The system according to claim 17, wherein the portion of the impact data received from the vendor data feed includes at least one of vendor spending data (SVS), vendor source income local impact data (VSILI), or vendor employee local spending data (VELS); and
   wherein the computer generates the impact calculation output based upon the at least one of the source data spending data (SVS), the vendor source income local impact data (VSILI), or the vendor employee local spending data (VELS).

19. The system according to claim 11, wherein the computer is further configured to:
   in response to receiving, from a vendor computer, a vendor data feed containing a portion of the impact data of the organization:
      automatically update the one or more impact calculation outputs for the organization based upon the portion of the impact data received from the vendor computer; and
      automatically update the organization impact file based upon the one or more impact calculation outputs as updated based upon the portion of the impact data received from the vendor computer.

20. The system according to claim 11, wherein the computer is further configured to generate a second organization impact file having a second file format translated from a first file format of the organization impact file.

* * * * *